(12) United States Patent
Struckmeier

(10) Patent No.: US 12,128,515 B2
(45) Date of Patent: Oct. 29, 2024

(54) NESTING OF WORKPIECES FOR CUTTING PROCESSES OF A FLAT-BED MACHINE TOOL

(71) Applicant: TRUMPF Werkzeugmaschinen GmbH + Co. KG, Ditzingen (DE)

(72) Inventor: Frederick Struckmeier, Karlsruhe (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 757 days.

(21) Appl. No.: 17/213,255

(22) Filed: Mar. 26, 2021

(65) Prior Publication Data

US 2021/0213581 A1 Jul. 15, 2021

Related U.S. Application Data

(63) Continuation of application No. PCT/EP2019/075937, filed on Sep. 25, 2019.

(30) Foreign Application Priority Data

Sep. 29, 2018 (DE) ..................... 10 2018 124 146.1

(51) Int. Cl.
*G05B 19/409* (2006.01)
*B23Q 1/03* (2006.01)
(Continued)

(52) U.S. Cl.
CPC ........... *B23Q 17/003* (2013.01); *B23Q 1/032* (2013.01); *G05B 19/40932* (2013.01)

(58) Field of Classification Search
None
See application file for complete search history.

(56) References Cited

U.S. PATENT DOCUMENTS 3,722,257 A * 3/1973 Bogart ................... G05B 19/18
425/DIG. 30
5,663,885 A * 9/1997 Stahl ........................ B26D 5/00
700/134
(Continued)

FOREIGN PATENT DOCUMENTS

CN 105740953 A 7/2016
CN 206747802 U 12/2017
(Continued)

OTHER PUBLICATIONS

FR-3041891-A1, Apr. 2017, France, Anjorand P. (Year: 2017).*
(Continued)

*Primary Examiner* — Hien D Khuu
(74) *Attorney, Agent, or Firm* — LEYDIG, VOIT & MAYER, LTD.

(57) ABSTRACT

A method generates a nesting plan for controlling a cutting process of a flatbed machine tool for cutting workpieces from a material sheet. The nesting plan includes an overlap-free arrangement of sub-spaces corresponding to the workpieces in a two-dimensional planning space as well as a spatial arrangement of predetermined supported spaces. After each new insertion of a sub-space during nesting, a packing density evaluation and at least one evaluation incorporating the position data of the respective initial position of the newly inserted sub-space in a local search space are performed.

17 Claims, 9 Drawing Sheets

(51) Int. Cl.
*B23Q 17/00* (2006.01)
*G05B 19/4093* (2006.01)

(56) References Cited

U.S. PATENT DOCUMENTS

| | | | |
|---|---|---|---|
| 5,748,762 | A | 5/1998 | Guez |
| 8,455,787 | B2 | 6/2013 | Takada |
| 2002/0072824 | A1 | 6/2002 | Susnjara |
| 2004/0016731 | A1 | 1/2004 | Erlenmaier |
| 2004/0236459 | A1* | 11/2004 | Clayton .............. G05B 19/418 700/171 |
| 2005/0122346 | A1 | 6/2005 | Horn |
| 2007/0270996 | A1 | 11/2007 | Roise |
| 2010/0064870 | A1 | 3/2010 | Olsen |
| 2012/0109352 | A1 | 5/2012 | Himeno et al. |
| 2017/0024497 | A1 | 1/2017 | Lyu et al. |
| 2017/0115656 | A1 | 4/2017 | Ottnad et al. |
| 2018/0071986 | A1* | 3/2018 | Buller .................. B28B 1/001 |
| 2018/0107189 | A1* | 4/2018 | Norberg Ohlsson .. G05B 19/19 |
| 2020/0096978 | A1* | 3/2020 | Baker .............. G05B 19/41865 |
| 2021/0034798 | A1* | 2/2021 | Bruneel .............. B23K 26/382 |
| 2021/0138589 | A1* | 5/2021 | Bader .............. G05B 19/4061 |

FOREIGN PATENT DOCUMENTS

| | | |
|---|---|---|
| DE | 102012212566 A1 | 1/2014 |
| DE | 102014213518 A1 | 1/2016 |
| DE | 102018126069 B3 | 10/2019 |
| DE | 102018126077 A1 | 4/2020 |
| EP | 1340584 B1 | 7/2006 |
| EP | 2029313 A1 | 3/2009 |
| EP | 2029314 A1 | 3/2009 |
| EP | 2029316 A1 | 3/2009 |
| EP | 2441547 A1 | 4/2012 |
| JP | H07299682 A | 11/1995 |
| JP | H09271977 A | 10/1997 |
| WO | WO 2005047998 A1 | 5/2005 |
| WO | WO 2007134628 A1 | 11/2007 |
| WO | WO 2007134630 A1 | 11/2007 |
| WO | WO 2007134631 A1 | 11/2007 |

OTHER PUBLICATIONS

WO-2009121335-A1, Oct. 2009, WO, Becker M. (Year: 2009).*

MTC Software, "ProNest 8.0 User Manuel," www.scribd.com, pp. 1-267, Oct. 2006, MTC Software, Lockport NY, USA.

Xie, et al., "Nesting of Two-Dimensional Irregular Parts: an Integrated Approach," *International Journal of Computer Integrated Manufacturing*, 20, 8, pp. 741-756, Dec. 2007, Taylor & Francis, Boca Raton FL, USA.

Yunqing, et al., "An Improved Hierarchical Genetic Algorithm for Sheet Cutting Scheduling with Process Constraints," *The Scientific World Journal*, 6, 2, pp. 1-10, Jan. 2013, Hindawi Publishing Corporation, Cairo, Egypt.

Wodziak, et al., "A Genetic Algorithm for Optimizing Multiple Part Placement to Reduce Build Time," pp. 1-14, Jan. 1994, Clemson University, Clemson SC, USA.

Junior, et al., "A Hybrid Methodology for Nesting Irregular Shapes: Case Study on a Textile Industry," *IFAC Proceedings*, 46, 24, pp. 15-20, Dec. 2013, IFAC Publisher, Lasenburg, Austria.

Bystronic Laser AG, "More Safety in the Laser Cutting Process," www.bystronic.com, pp. 1-4, Feb. 2019, Bystronic Laser AG, Niederoenz, Switzerland.

Struckmeier, et al., "Nesting in the Sheet Metal Industry: Dealing with Constraints of Flatbed Laser-Cutting Machines," *Procedia Manufacturing*, 29, pp. 575-582, Dec. 2019, Elsevier, Amsterdam, Netherlands.

Egeblad, et al., "Fast Neighborhood Search for Two- and Three-Dimensional Nesting Problems," *European Journal of Operational Research*, 183, 3, pp. 1249-1266, Dec. 2007, Elsevier, Amsterdam, Netherlands.

Francis, et al., "State of the art of Nesting," *International Research Journal of Engineering and Technology*, 4, 6, pp. 2048-2054, Jun. 2017, Fast Track Publications, Tamilnadu, India.

Dowsland, et al., "An Algorithm for Polygon Placement Using a Bottom-Left Strategy," *European Journal of Operational Research* 141, 2, pp. 371-381, Dec. 2002, Elsevier, Amsterdam, Netherlands.

Liu, et al., "Algorithm for 2D Irregular-Shapes Nesting Problem Based on the NFP Algorithm and Lowest-Gravity-Center Principle," *Journal of Zhejiang University—Science A*, 7, 4, pp. 570-576, Apr. 2006, Zhejiang University Press and Springer Science+Business Media, Hangzhou, China.

Dewil, et al., "A Review of Cutting Path Algorithms for Laser Cutters," *D. Int J Adv Manuf Technol*, 87, 5-8, pp. 1865-1884, Dec. 2016, Springer Science+Business Media, New York, USA.

Bennell; et al., "The Geometry of Nesting Problems: A Tutorial," *European Journal of Operational Research*, 184, pp. 397-415, Dec. 2008, Elsevier, Amsterdam, Netherlands.

Sherif, et al., "Sequential Optimization Approach for Nesting and Cutting Sequence in Laser Cutting," *Journal of Manufacturing Systems*, 33, 4, pp. 624-638, Dec. 2014, World Scientific Publishing Co., Singapore.

Poshyanonda, et al., "Two Dimensional Nesting Problem: Artificial Neural Network and Optimization Approach," Proceedings of 1992 International Joint Conference on Neural Networks, 4, pp. IV 572-IV 577, Dec. 1992, IEEE, USA.

Hopper, "Two-Dimensional Packing Utilising Evolutionary Algorithms and Other Meta-Heuristic Methods," Thesis, pp. 1-80, May 2000, University of Wales, Cardiff, Wales.

Ratanapan, et al., "An Object-Based Evolutionary Algorithm for Solving Nesting Problems," *International Journal of Production Research*, 45, 4, pp. 845-869, Feb. 2007, Taylor & Francis, Boca Raton FL, USA.

Poshyanonda, et al., "Genetic Neuro-Nester," *Journal of Intelligent Manufacturing*, 15, pp. 201-218, Dec. 2004, Kluwer Academic Publishers, Dordrecht, Netherlands.

* cited by examiner

FIG 4D
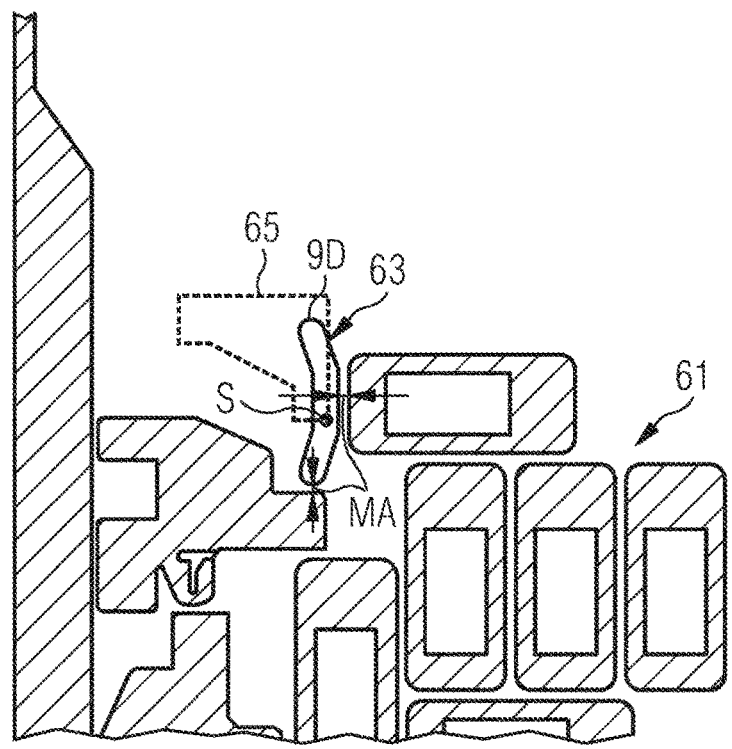
FIG 4E
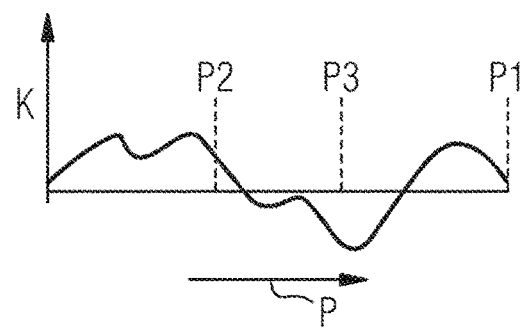
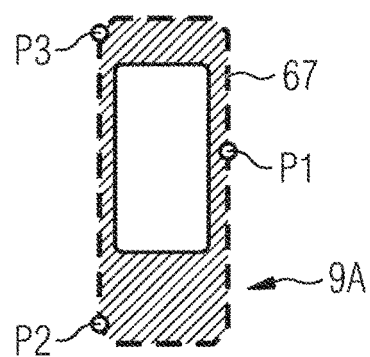

FIG 5

$$\min W_{PD} \times z_{PD} + W_T \times z_T + W_{SD} \times z_{SD}$$

$$s.t. \ \max\{r | \Sigma_c(c,r) \geq 1\} \leq z_{PD} \qquad (1)$$

$$\sum_{(c,r)} \psi_{(c,r)} \times \theta_{(c,r)} \leq z_{SD} \qquad (2)$$

$$\sum_\epsilon \epsilon_{t_i}(\Psi) \leq z_T, \forall_i \ t \qquad (3)$$

$$\sum_{(c,r)} t_i^{(c,r)} \geq q_t, \forall t_i \qquad (4)$$

$$(c,r) = \sum_{t_i} t_i(t) \leq 1, \forall (c,r) \qquad (5)$$

$$z_{PD}, z_T, z_{SD} \in N \qquad (6)$$

$$\epsilon, \psi \in \{0,1,2\}, \theta \in \{0,1\} \qquad (7)$$

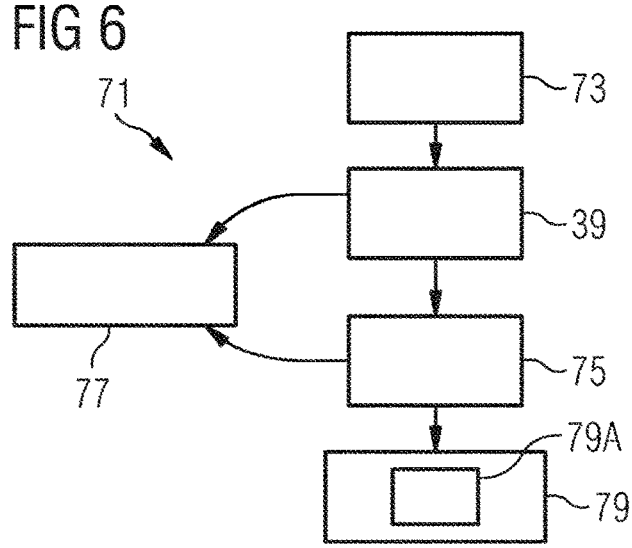

FIG 6

NESTING OF WORKPIECES FOR CUTTING PROCESSES OF A FLAT-BED MACHINE TOOL

CROSS-REFERENCE TO PRIOR APPLICATIONS

This application is a continuation of International Patent Application No. PCT/EP2019/075937, filed on Sep. 25, 2019, which claims priority to German Patent Application No. DE 10 2018 124 146.1, filed on Sep. 29, 2018. The entire disclosure of both applications is hereby incorporated by reference herein.

FIELD

The present invention relates to a nesting method for workpieces to be cut by a flatbed machine tool, in particular to a method for generating a nesting plan for controlling a cutting process of a flatbed machine tool, e.g., a flatbed laser cutting machine.

BACKGROUND

In the sheet metal working industry, the nesting of workpieces to be cut on a raw material sheet is part of the production process, whereby the nesting results in a specific layout of cutting lines. Herein, the result of the nesting is also called a nesting plan.

Such 2D nesting problems are solved for flatbed laser cutting machines primarily for minimizing the raw material to be used because the raw material usually accounts for a significant portion of the total cost. However, other aspects also influence the total cost, such as delays in the cutting process or extended downtime of the flatbed machine tool due to service or repair. In this context, for example, US 2012/0109352 A1 discloses a method for generating nesting data while avoiding an overlap of a cutting path with support projections, in particular to reduce damage to the support. Furthermore, CN 105740953 A discloses a workpiece nesting, e.g., for punching operations, based on a quantum evolutionary algorithm. Furthermore, EP 2 029 313 A1 discloses an optimization of a workpiece support with regard to the wear of support point tips and a guarantee of a finished and residual part deposition.

Background on nesting approaches, especially for nonfit polygons, is summarized in "The geometry of nesting problems: A tutorial," by J. A. Bennell et. al, European Journal of Operational Research 184 (2008) 397-415.

SUMMARY

In an embodiment, the present invention provides a method for generating a nesting plan for controlling a cutting process of a flatbed machine tool for cutting workpieces from a material sheet. The nesting plan includes an overlap-free arrangement of sub-spaces, which correspond to the workpieces, in a two-dimensional planning space, and a spatial arrangement of predetermined supported spaces. The supported spaces correspond to support surface areas of the material sheet, which are supported during the cutting process. The method includes providing cutting process data including: geometry data of the planning space in which the sub-spaces can be arranged, position data indicating positions of the supported spaces in the planning space, sub-space data corresponding to a plurality of the sub-spaces each corresponding to a workpiece type, and number data indicating quantities of the sub-spaces to be nested in the planning space. The method also includes providing nesting input parameters including: a workpiece minimum distance that at least is present between two adjacent ones of the sub-spaces arranged in the planning space, an insertion sequence according to which the sub-spaces are inserted during a sequential generation of the nesting plan, and an arrangement rule according to which the sub-spaces are arranged spatially within the planning space one after the other. Further, the method includes: arranging a first sub-space, of the sub-spaces, according to the insertion sequence and the arrangement rule in the planning space; and sequentially inserting of further sub-spaces, of the sub-spaces, in accordance with the insertion sequence and the arrangement rule in the planning space, the arrangement rule assigning to a newly inserted sub-space, of the sub-spaces, in the planning space respectively an initial position in which at least one point of the newly inserted sub-space is arranged at the workpiece minimum distance from another sub-space, of the sub-spaces, previously inserted. The arrangement rule further includes: performing, after each new insertion of a sub-space of the sub-spaces, a packing density evaluation and at least one evaluation incorporating the position data of the respective initial position of the newly inserted sub-space, setting up, depending on an evaluation result of the initial position of the newly inserted sub-space, a local search space that comprises at least one alternative position for the newly inserted sub-space, evaluating the at least one alternative position with the packing density evaluation and the at least one evaluation incorporating the position data; and comparing the evaluation results of the initial position and the at least one alternative position in order to determine, for the insertion sequence, one of the evaluated positions as a cutting position for the newly inserted sub-space, in the nesting plan.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 4A-4E are schematic representations to illustrate local searches;

FIG. 5 is a mathematical equation model of an evaluation of a nesting plan;

FIG. 6 is a flowchart of a method for generating a cutting process-oriented nesting plan;

DETAILED DESCRIPTION

Figure 1:
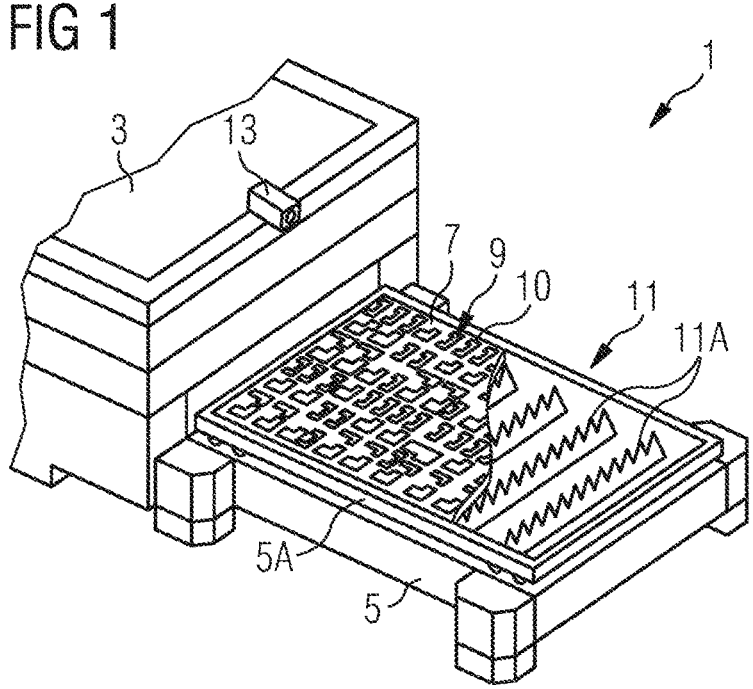
FIG. 1 is a schematic spatial representation of a flatbed machine tool.

An aspect of the present disclosure is to provide a nesting plan for a plurality of workpieces to be cut that reduces manufacturing costs, particularly with respect to material costs and costs directed to the cutting process.

In one aspect, a method for generating a nesting plan for controlling a cutting process of a flatbed machine tool for cutting workpieces from a material sheet is disclosed. Thereby, the nesting plan includes an overlap-free arrangement of sub-spaces, which correspond to the workpieces, in a two-dimensional planning space and a spatial arrangement of predetermined supported spaces. The supported spaces corresponding to support surface areas of the material sheet, which are supported during the cutting process. The method comprises:

providing cutting process data including:
geometry data of the planning space in which the sub-spaces can be arranged,
position data indicating the positions of the supported spaces in the planning space,
a plurality of sub-spaces, each corresponding to a type of workpiece, and
number data indicating quantities of the sub-spaces to be nested in the planning space, as well as a
providing nesting input parameters including:
a workpiece minimum distance that at least is present between two adjacent sub-spaces arranged in the planning space,
an insertion sequence according to which the sub-spaces are inserted during a sequential generation of the nesting plan, and
an arrangement rule according to which the sub-spaces are arranged spatially within the planning space one after the other.

According to the method, a first sub-space is arranged in the planning space in accordance with the insertion sequence and the arrangement rule; and further sub-spaces are inserted sequentially in the planning space in accordance with the insertion sequence and the arrangement rule, wherein the arrangement rule assigns to a newly inserted sub-space in the planning space in each case an initial position in which at least one point of the sub-space is arranged at the workpiece minimum distance from another previously inserted sub-space there takes place an arranging a first sub-space according to the insertion sequence and the arrangement rule in the planning space; a sequentially inserting of further sub-spaces in accordance with the insertion sequence and the arrangement rule in the planning space, wherein the arrangement rule assigns to a newly inserted sub-space in the planning space respectively an initial position in which at least one point of the sub-space is arranged at the workpiece minimum distance from another sub-space previously inserted (i.e., in other words, all other points of the sub-space are further away except for these points). The arrangement rule further includes performing, after each new insertion of a sub-space, a packing density evaluation and at least one evaluation incorporating the position data of the respective initial position of the newly inserted sub-space, setting up, depending on an evaluation result of the initial position of a newly inserted sub-space, a local search space, in particular variable and/or weight-dependent, which includes at least one alternative position for the newly inserted sub-space; evaluating the at least one alternative position with the packing density evaluation and the at least one evaluation incorporating the position data; and comparing the evaluation results of the initial position and the at least one alternative position in order to determine, specifically for the insertion sequence, one of the evaluated positions as cutting position for the newly inserted sub-space, in the nesting plan.

In another aspect, a corresponding method for generating a nesting plan for controlling a cutting process of a flatbed machine tool includes the steps of:

sequentially arranging of sub-spaces according to an insertion sequence and an arrangement rule in the planning space, the arrangement rule assigning to a newly inserted sub-space in the planning space respectively an initial position in which at least one point of the sub-space is arranged at the workpiece minimum distance from another sub-space previously inserted (i.e. in other words, except for these points, all other points of the sub-space are located further away), evaluating the at least one alternative position with a packing density evaluation and at least one evaluation incorporating the position data, setting up, depending on an evaluation result of the initial position of a newly inserted sub-space, a local search space that includes at least one alternative position for the newly inserted sub-space, evaluating the at least one alternative position with the packing density evaluation and the at least one evaluation incorporating the position data; and comparing the evaluation results of the initial position and the at least one alternative position to determine specifically for the insertion sequence one of the evaluated positions as cutting position for the newly inserted sub-space in the nesting plan.

In another aspect, a method for determining a cutting process-oriented nesting plan for controlling a cutting process of a flatbed machine tool for cutting workpieces from a material sheet includes the steps of:

providing a plurality of insertion sequences of the sub-spaces, wherein the insertion sequences represent genes of a first generation of an evolutionary algorithm, generating a nesting plan for each of the insertion sequences using a method as previously described, so that in the nesting plans the sub-spaces are arranged at cutting positions determined accordingly for the respective insertion sequence, generating an total evaluation for each of the nesting plans based on the packing density evaluations and ad the at least one evaluation of the cutting positions of the respective nesting plan incorporating the position data, wherein the total evaluations represent the application of a fitness function to the genes of the evolutionary algorithm, repeatedly creating further insertion sequences by mutating, crossover and/or selection of existing insertion sequences using the existing total evaluations, generating further nesting plans according to the method described above, and creating further total evaluations for the further insertion sequences, and comparing the total evaluations to select the cutting process-oriented nesting plan from the set of generated nesting plans.

In some embodiments, a nesting plan including the sub-spaces arranged at the cutting positions is output. A sub-space may be defined by a contour and optionally a rotational state in the two-dimensional planning space of the planning sheet. The workpiece minimum distance can be provided specifically for a material to be cut and for a cutting process. In particular, the workpiece minimum distance can be predetermined depending on parameters of the material and the cutting process. The workpiece minimum distance can be implemented with respect to the nested alternative positions and, at the same time, with respect to the cutting lines within a laser cutting process. The fact that one or more points, usually located on the contour of the sub-space, have a minimum distance means that, except for these points, all other points of the sub-space are located further away from previously assigned sub-spaces (the points located in them). In other words, the minimum distance constraint means that no point of a sub-space is closer to a point of another sub-space than given by the minimum distance. This is fulfilled for all allowed positions of sub-spaces, wherein the initial position fulfills the additional condition that at least one point of the sub-space is located in the workpiece minimum distance from another previously inserted sub-space.

The local search space can be formed one-dimensional or two-dimensional in the planning space and, in particular, can extend in the planning space away from previously inserted sub-spaces. Furthermore, the local search space can be set up in such a way that it includes alternative positions, for the occupation of which a sub-space to be inserted is to be displaced from the initial position in a non-material-optimized direction. Furthermore, the local search space can be set up in such a way that an alternative position is generated by applying a translation and/or rotation operation to the initial position or another alternative position, in particular by translation operation in a non-material-optimized direction, wherein the boundary condition of an overlap-free arrangement is preserved.

Furthermore, the local search space can be set up in such a way that in the alternative position the newly inserted sub-space has a greater distance from a previously inserted sub-space in at least one direction than the newly inserted sub-space in the initial position, and/or that, in the alternative position, the newly inserted sub-space has been displaced from the initial position in at least one direction and is free of overlap with respect to previously inserted sub-spaces. Furthermore, at least one approaching direction can be assigned to the arrangement rule, and the local search space can be set up in such a way that, in the alternative position, the newly inserted sub-space is arranged in a manner displaced in a direction opposite to at least one of the at least one approaching direction from the initial position.

The search space can further be set up by at least some of the possible positions of a pressure point on a contour of a sub-space to be evaluated.

In some embodiments, the arrangement of the first sub-space may further be adjusted in its position data using the evaluation incorporating the position data by a translation and/or rotation operation.

According to the method, the position data can further be acquired by
- a sensor system of the flatbed machine tool, in particular a capacitive distance sensor system for distance detection between the nozzle and the material sheet, wherein at least one subgroup of the support bars and/or the bar tips is detected and optionally the positions of non-detected support bars and/or bar tips are calculated by interpolation,
- an optical sensor system based on at least one of the following methods: image processing method based on a surface image acquisition, a laser light section method, a strip light projection method, a light field camera, a TOF camera, in particular for depth detection of bar depressions, the condition detection of the geometric shape for an accompanying assessment of wear of a support bar and/or a bar tip, and/or
- an ultrasonic sensor system, which uses ultrasonic sensors, in particular on a cutting head of the flatbed machine tool.

In some embodiments, multiple evaluations incorporating the position data may be made for a to be evaluated position of the sub-space, and the evaluation values of these evaluations and the packing density evaluation may be combined with weights to determine an evaluation value of the to be evaluated position of the sub-space. Thereby, the weights may be chosen to achieve a specific characteristic of the nesting plan. Furthermore, the size of the local search space can be variably adjustable by the weights.

In some embodiments, sections of the contour or positions along the contour can be assigned to the supported spaces using the position data to evaluate a sub-space positioned in an alternative position, and an evaluation value can be determined for the supported space depending on the extent of the assigned sections of the contour or positions along the contour. Additional support spaces in the planning space can be identified and, with the help of the position data, sections of the contour or positions along the contour can be assigned to the identified additional support spaces for the evaluation of a sub-space positioned in an alternative position. The evaluation values for the support spaces can then be determined as a function of the extent of the sections of the contour or positions along the contour assigned to the additional support spaces. The evaluation values of the supported spaces and the additional support spaces can be combined with weights to obtain an evaluation value for a position of the sub-space to be evaluated.

Further aspects include a computer program (or computer program product) and a computer-readable medium on which a corresponding computer program is stored. The computer program/computer program product comprises instructions which, when the program is executed by a computer, in particular by a computer-implemented controller for operating a flatbed machine tool or a planning unit, cause the computer/controller to execute/cause the procedures described herein for generating a (cutting process-oriented) nesting plan.

The computer program/computer program product and the computer-readable medium are accordingly provided for carrying out one of the aforementioned methods. The computer program may be stored on a non-volatile memory used in particular as part of a controller for operating a flatbed machine tool or a planning unit.

The concepts described herein can be advantageous in terms of reduced wear of the support bars, an increase in part quality, a reduction in scrap pieces, and shorter cutting times. Furthermore, increased process reliability can be achieved, accompanied by reduced maintenance work. In general, the costs of the cutting process can be reduced or even minimized by the nesting achieved.

In laser cutting, workpieces may be nested in such a way that the highest possible material utilization is achieved and, accordingly, the amount of waste material is low.

Concepts described herein are based in part on the realization that such an approach does not always minimize cutting costs, because the position of the pieces relative to the support bars can also be relevant to total costs. This is because, depending on the position of the pieces on the pallet, there may be wear on the support bars, for example, during insertion. Furthermore, material-optimized nesting can lead to longer cutting times or a reduction in the quality of the piece, for example, due to a break-off of the kerf in borderline processes or due to welding or fly-off of slugs. Furthermore, tilting of pieces and collisions of a cutting head with cut material can occur.

Aspects described herein are based in part on the recognition that, in addition to minimizing raw material costs, costs associated with the cutting process also affect the quality of a nesting operation. Costs associated with the cutting process arise from the rather low process reliability of flatbed laser cutting systems and include, for example, damage to support bars or machine failure due to collisions of a cutting head with tilted workpieces.

The inventors have recognized that at least some of these constraints associated with the cutting process relate to the relative position of the raw sheet (and thus the cutting lines distributed on the raw sheet) with respect to the supporting points of the support bars.

The concepts described herein may allow to respond to given configurations of support bars and still generate compact nestings. The aim includes avoiding large residual grid widths.

Concepts proposed herein assume, inter alia, that the positions of the supported points to be taken into account (supported areas of the material sheet, in particular support surface areas of the underside of the material sheet) are known when a nesting plan is generated or can at least be set for a cutting process in such a way that they can be adapted to predetermined positions on which the planning is based.

Nesting methods, which propose nesting of workpieces on a pallet, can be based on evolutionary algorithms. The process-oriented nesting methods disclosed herein can also be implemented as evolutionary algorithms. In this case, the evaluation (fitness function of the evolutionary algorithm) of a proposed solution (herein also referred to as solution for short) not only takes into account the material content, but also evaluates other properties of a nesting plan that are relevant for the cutting costs. For example, the position of the pieces relative to the support bars of a pallet and the position of the incision points can be included in the evaluation.

The methods disclosed herein can be incorporated into the cutting process in such a way that required manufacturing process data is read in when a material sheet is placed on a pallet. The relative positions of the supported spaces relative to the material sheet can be determined during operation, for example. This can be done, for example, with a sensor system of the flatbed machine tool, in particular a capacitive distance sensor system for distance detection between the nozzle of the flatbed machine tool and the material sheet. In general, at least a subset of the support bars and/or the bar tips can be detected and optionally the positions of non-detected support bars and/or bar tips can be calculated by interpolation. Further measurement methods are based, for example, on an optical sensor system based on at least one of the following methods: image processing methods based on an area image acquisition, a laser light section method, a strip light projection method, a light field camera, a TOF (time of flight) camera, in particular for depth detection of bar depressions, the condition detection of the geometric shape for an accompanying assessment of wear of a support bar and/or a bar tip, and/or on an ultrasonic sensor system, which uses ultrasonic sensors, in particular on a cutting head of the flatbed machine tool.

Furthermore, the methods proposed herein may be based on fixed/pre-determined relative positions of the supported areas relative to the planning sheet, wherein the generation of the nesting plans and in particular the evaluations incorporating the position data are made based on the fixed/pre-determined relative positions. For the manufacturing process, it is then necessary to ensure the fixed/pre-determined relative positions of the supported areas relative to the nesting plans transferred to the material sheet.

In the previously mentioned approaches, the relative positions are respectively known and represent input parameters, which in turn can be adjustable and accordingly represent a further degree of freedom in the process-oriented nesting.

Figure 2:
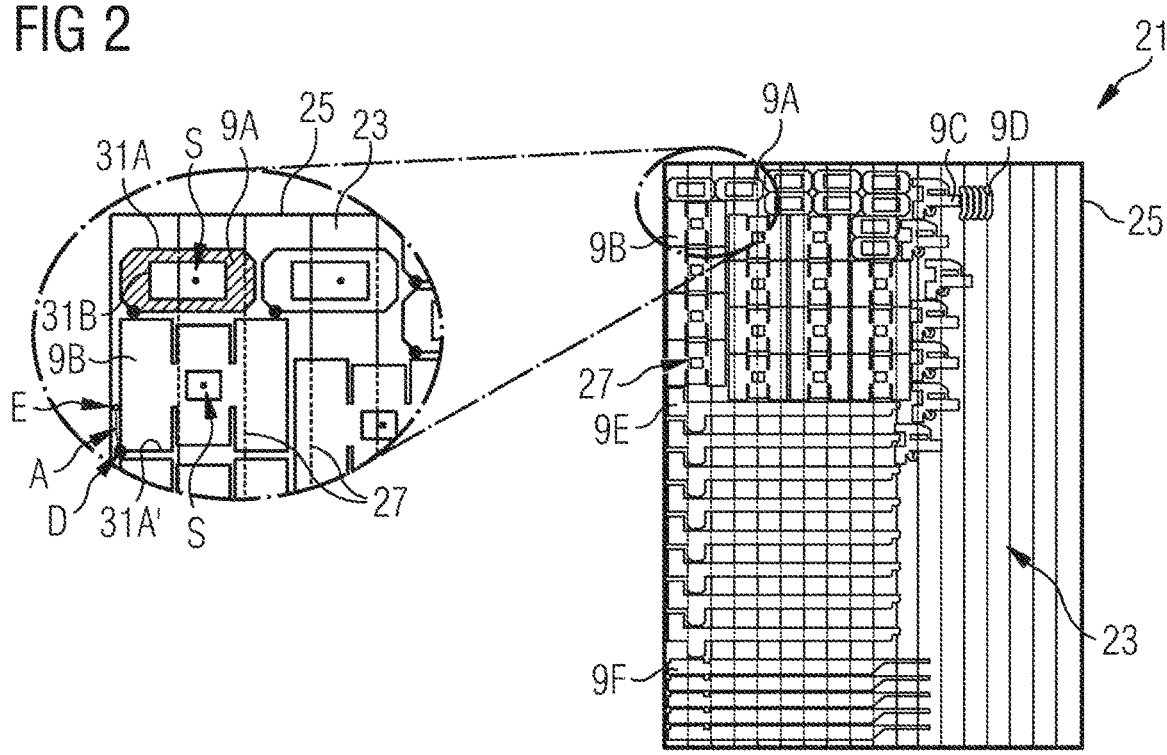
FIG. 2 is a schematic representation of a nesting plan.

In the following, the generation of workpieces with a flatbed laser cutting machine is first explained and this generation is brought into relation with nesting plans (FIGS. 1 and 2). Methods for generating a nesting plan are then explained in connection with FIGS. 3 to 5 and, in connection with FIGS. 6 and 7, the methods are explained with regard to the generation of a process-oriented nesting plan with an evolutionary algorithm. Finally, an exemplary evaluation approach of a nesting plan with regard to the influence of support bars on the cutting process of a material sheet, in particular of supported spaces in the planning space, is presented in connection with FIGS. 8 to 12.

A schematic flatbed machine tool 1 shown in FIG. 1 includes a main housing 3 in which the cutting process is performed with a laser beam. In particular, a focus of the laser beam is guided by a control system along predetermined cutting lines arranged in a processing area over a material in order to cut workpieces with specific shapes from, for example, a substantially two-dimensionally extending sheet metal.

Furthermore, the flatbed machine tool 1 includes a pallet changer 5. The pallet changer 5 is configured to position one or more pallets during manufacture. On a pallet 5A, a material sheet to be cut (as raw material or starting material) can be stored and introduced into the main housing 3 for the cutting operation. After the cutting process is completed, the pallet 5A can be moved out of the main housing 3 with a cut material sheet 7, as shown in FIG. 1, so that the cut workpieces 9 can be picked.

In the main housing 3, the laser processing head from which the laser beam emerges can be freely positioned in the processing area so that the laser beam can be guided essentially along any two-dimensional cutting lines over the material sheet to be cut. During laser cutting, the laser beam heats the metal along the cutting line until it melts. A jet of gas, usually nitrogen or oxygen, exits the laser processing head usually in the area of the laser beam and forces the molten material down and out of the gap that forms. The material sheet 7 is thus completely severed by the laser beam during cutting.

To cut out a workpiece 9, the laser beam is moved along a cutting line 10. The cutting line 10 usually starts at an incision point, which is located outside the workpiece 9, and then approaches the contour of the workpiece 9 in an arc (the so-called initial cutting line). The point where the cutting line first touches the contour of the workpiece is the point where the cut is later completed (assuming a continuous cutting process). This point is called the pressure point because it is the point at which the exiting gas jet exerts a pressure on the cut piece; specifically, at the point in time, when the piece is free to move for the first time. Particularly in the case of thin material sheets, the gas pressure can cause the workpiece to tilt, potentially causing a portion of the workpiece to protrude out of the plane of the metal sheet and collide with the cutting head, for example.

In the embodiment shown, the pallet 5A has several support bars 11 running transverse to the intake-direction and aligned parallel to each other. By way of example, the support bars 11 have a spacing of, for example, 60 mm from one another. The support bars 11 form supporting areas 11A on which the material sheet 7 is deposited. The supporting areas 11A usually form grid points which may have a spacing of, for example, 15 mm along the support bars 11. A support bar has a thickness of, for example, 2 mm. The supporting areas 11A thus form a grid of areas that can influence the cutting process of the material sheet 7, which lies on the supporting areas 11A. The areas of the support bars, which influence the cutting process, can moreover extend to areas, which directly adjoin the supporting areas that are in contact with the material sheet, e.g., the flanks of the support bars 11 leading to the supporting areas 11A.

FIG. 1 further shows a camera 13 arranged, for example, on the main housing 3. The camera 13 can be configured, inter alia, for image acquisition of the pallet 5A, the support bars 11 and supporting areas 11A, as well as the relative position of the material sheet 7 with respect to the pallet 5A (and possibly the support bars 11 and supporting areas 11A). The camera 13 is in connection with an image evaluation unit of the control system of the flatbed machine tool 1.

It can be seen that-due to the support in localized areas-process-related risks can influence the process reliability. For example, tilting a workpiece 9 can cause damage to the workpiece 9 and/or a cutting head, thereby increasing the risk of reject pieces and downtime. Furthermore, damage to the support bars 11 leads to higher service costs for replacement or longer downtimes. Furthermore, in the case of removal of the support bar 11 in the supporting area 11A, the number of supporting points may be reduced, which may increase the risk of tilting of the workpieces 9. If the cutting line 10 runs in the vicinity of a supporting area 11A, there is an increased risk of a reduction in the quality of, for example, the underside of the workpiece. Also, the cutting process may stop if molten material cannot be sufficiently blown out of the gap and thus a workpiece is not completely cut off, each of which may result in more reject pieces.

Thus, one feature of nesting methods described herein is also to provide a process-oriented arrangement of the workpieces 9 in the material sheet 7, which reduces the risks listed above and possible add-on costs due to, for example, reject pieces as well as service and breakdown of the flatbed machine tool.

A boundary condition for the nesting of workpieces 9 when cutting sheets is a minimum distance between cutting lines 10. This is caused by thermal effects during heating along the cutting line 10, if it is, e.g., too close to an already heated area, and/or by the requirement of a safety distance in case a workpiece should tilt. However, the minimum distance is also directly reflected in the amount of lost material and thus in the material costs.

The minimum distance is, thus, a parameter that is specific to a material to be cut (type of material and geometry, in particular thickness, of the material) and to a cutting process (to account for, e.g., process-related expansion or deformation of the material). Transferred to the generation of a nesting plan, the distance between contours of adjacent sub-spaces must not fall below the minimum distance, otherwise a required quality of the cutting process can no longer be guaranteed when applying the nesting plan to a material sheet. In the concepts disclosed herein, the minimum distance underlies the nesting process as a nesting input parameter and is implemented accordingly in the cutting process. Thus, a further feature of the concepts disclosed herein is to keep the distance between cutting lines low in consideration of process-related costs, i.e., spacing at the minimum distance is also possible.

Further boundary conditions can concern the duration of the cutting process and/or lost paths during the movement of the processing head.

Furthermore, for example, additional slug-specific aspects can be evaluated by including the positions of the supporting areas, such as a tilting probability of an inner area (slug), which was cut out of a workpiece, or the probability that a slug will drop out of the workpiece. The former can be done in nesting with the help of the mentioned evaluation procedures that assess tilting; the latter can be done, for example, by matching supported spaces with slug spaces.

FIG. 2 shows a nesting plan 21 as it can be generated with an arrangement rule known as bottom (main direction)-left (secondary direction) arrangement rule in a two-dimensional planning space 23 using an evolutionary algorithm. The main direction runs from right to left and the secondary direction from top to bottom in FIG. 2. The planning space 23 is set up in the area of a planning sheet 25. The planning sheet 25 is transferred to the material sheet for the cutting process in such a manner that corresponding geometry data of the planning space 23 corresponds to the machining area provided by the cutting machine 1 for a workpiece sheet 7 (and the support coincides with the assumed position data of the supported spaces). In the present example, a rectangular planning space 23 is assumed to be applied to a corresponding rectangular shaped material sheet.

The nesting plan is created in a planning phase preceding the cutting process. For example, the controller of the flatbed machine tool may create the nesting plan, if, for example, currently recorded position data are included in the planning. An independent planning unit with corresponding computing capacity may create the nesting plan, if, for example, predetermined position data are assumed and these position data are then subsequently implemented for the cutting process on the basis of appropriate positioning of the material sheet on the pallet and the support bars.

The nesting plan 21 shows an overlap-free arrangement of sub-spaces 9A-9F in the two-dimensional planning space 23, where the sub-spaces 9A-9F (also two-dimensional) correspond to six different types of workpieces.

The nesting plan 21 concerns the generation of 50 test workpieces. That is, the various sub-spaces 9A-9F were nested several times. In other words, the nesting plan 21 is based on quantity data indicating numbers of the sub-spaces 9A-9F to be nested in the planning space 23.

The arrangement shown is based on an insertion sequence for the total of 50 sub-spaces. An insertion sequence generally determines the sequence in which the sub-spaces are inserted one after the other into the planning space 23 during a sequential generation of the nesting plan 21. The sub-spaces are arranged here, as an example, according to a bottom-left strategy in the planning space 23.

The nesting plan 21 also schematically shows a spatial arrangement of predetermined supported spaces 27. In order to clarify the origin of the supported spaces, the supported spaces are partially combined in lines, similar to the support bars, and are only shown as points in the area of the sub-spaces 9A-9F. As already mentioned for the nesting methods described below, position data are available, which indicate the positions of the supported spaces 27 in the planning space 23. The position data are used in the evaluation of positions of the sub-spaces.

For illustration, additional cutting process data and parameters are shown in an enlarged section of a corner of planning space 23. Each of the sub-spaces is bounded by one or more closed contours. As an example, an outer contour 31A and an inner contour 31B are drawn for sub-space 9A (highlighted by dashes). For an outer contour 31A' of sub-space 9B, an insertion point E, an approach path A, and a pressure point D are also drawn.

The same sub-spaces are taken several times and are positioned at different positions in the planning space 23. Thus, the tilting behavior of one type of sub-space can be studied in different positions with respect to the supported spaces 27.

The exemplary sub-spaces further have different sizes, but are all small enough for the gas pressure to influence the stability of a sub-space. In the enlarged area of FIG. 2, one can see individual supported spaces 27 within the sub-space 9B. Together with the respective pressure point D and the respective center of gravity S of a sub-space, the supported spaces 27 define a susceptibility to tilting of a workpiece given by the sub-space 9B. For the three sub-spaces shown in the enlarged section, a susceptibility to tilting was determined for a given gas pressure. This is due to the fact that the pressure points are located at sections of the contours that are far away from possible tilting axes. The possible tilting axes are formed, for example, by a line of supporting areas 11A. Accordingly, lever conditions favorable for tilting are present.

The nesting plan 21 shown in FIG. 2 is also based on a workpiece minimum distance. The workpiece minimum distance is determined, inter alia, by the material thickness of the material sheet, which is to be subdivided according to the nesting plan, and the cutting parameters to be used. At least the workpiece minimum distance is to be given between two adjacent sub-spaces 9A-9F arranged in the planning space 23. The workpiece minimum distance lies, for example, in a range of 5 mm to 20 mm, in particular 10 mm. The workpiece minimum distance cannot be resolved in the schematic view of FIG. 2 (see also FIG. 4D for a workpiece minimum distance MA). The workpiece minimum distance ensures that a cutting line does not have a negative effect on an adjacent cutting line with regard to the cutting process (e.g., a cutting quality).

For the nesting procedures described below, one can use in general arrangement rules that define how sub-spaces in the planning space are arranged spatially one after the other. This is not limited to a bottom-left strategy, such as that underlying the exemplary nesting plans shown in the figures. Rather, bottom-left-fill strategies or no-fit-polygon approaches (see also description for FIG. 4D), for example, can also be used.

Figure 3:
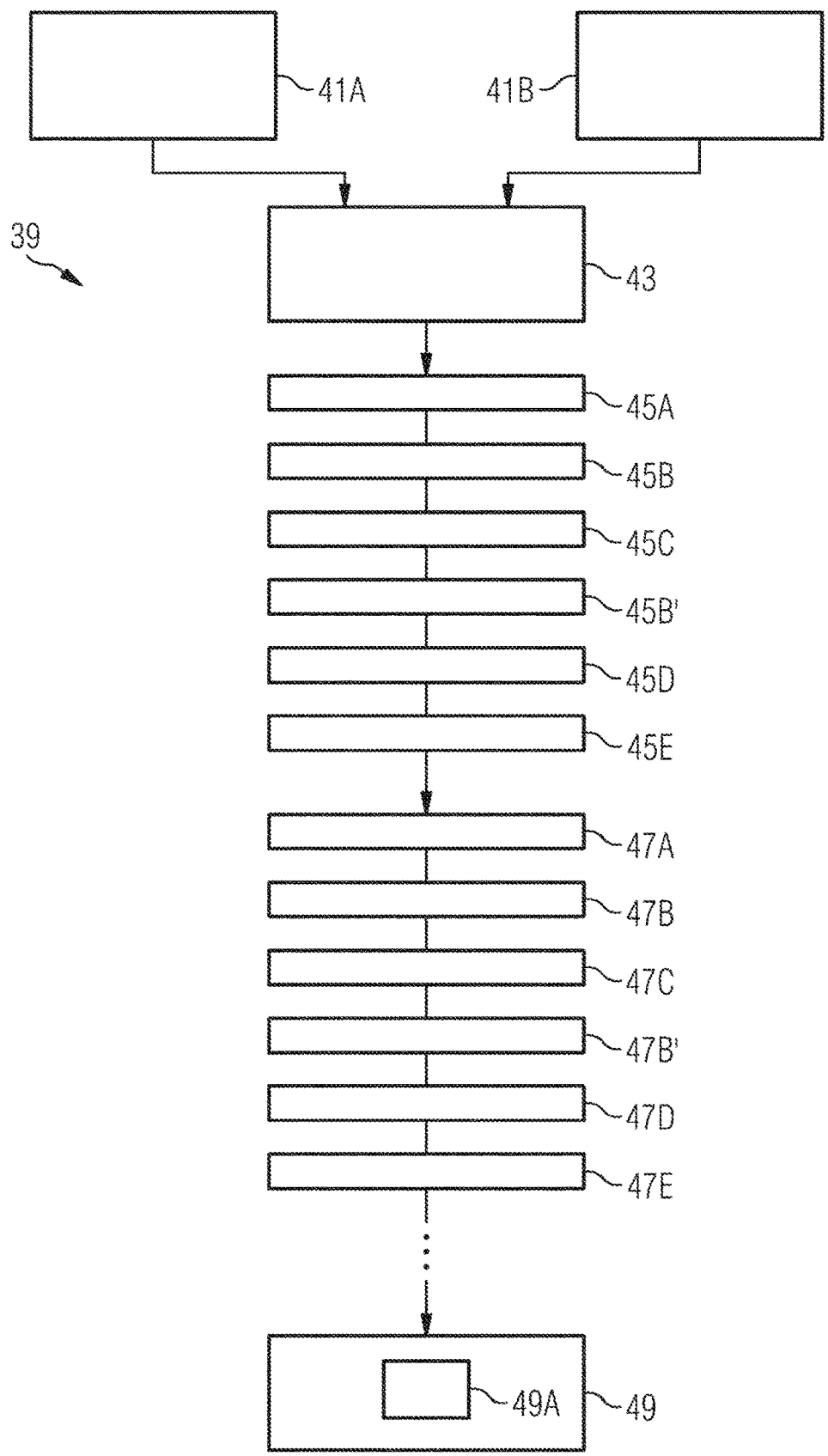
FIG. 3 is a flow diagram of a method for generating a nesting plan for controlling a cutting process of a flatbed machine tool.
Figure 4A:
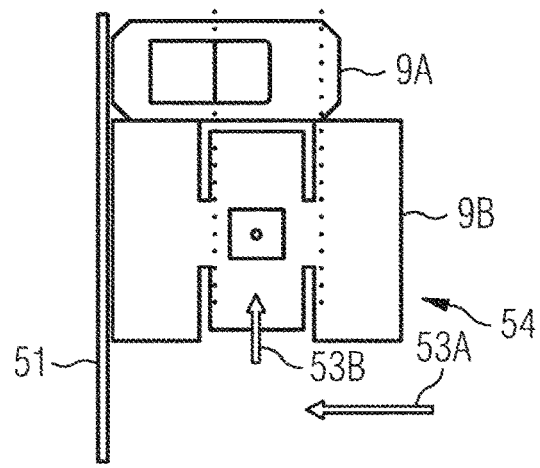

With reference to the flowchart of a method 39 for generating a nesting plan in FIG. 3, the nesting methods proposed herein generally assume that cutting process data (such as geometry data of the planning space, position data for the positions of the supported spaces, a plurality of sub-spaces to be arranged, and their quantity data) are provided (steps 41A, 41B) together with nesting input parameters (such as workpiece minimum distance, insertion sequence, and arrangement rule).

According to the insertion sequence and the arrangement rule, a nesting method arranges a first sub-space (sub-space) in the planning space (starting position of the first sub-space listed in the insertion sequence) in a first step 43. A position herein usually refers to a reference point of one of the sub-spaces, e.g., a center of gravity of an area corresponding to the center of mass of a cut-out workpiece (assuming a uniform thickness of the material sheet). (It is noted that, anticipating the evaluations described below, this first arrangement step, i.e., the starting position, can already be evaluated and improved accordingly by varying the position of the sub-space or other parameters).

In a series of further steps 45A, 47A, . . . additional sub-spaces are now inserted in the planning space according to the insertion sequence and the arrangement rule. The arrangement rule assigns an initial position within the planning space (see also initial position 54 in FIG. 4A) to each newly inserted sub-space. In that initial position, at least one point of the sub-space is arranged at the workpiece minimum distance from another previously inserted sub-space.

After each new insertion of a sub-space, there are performed a packing density evaluation and at least one evaluation incorporating the position data of the respective initial position of the newly inserted sub-space (step 45B, 47B, . . . ).

Figure 4B:
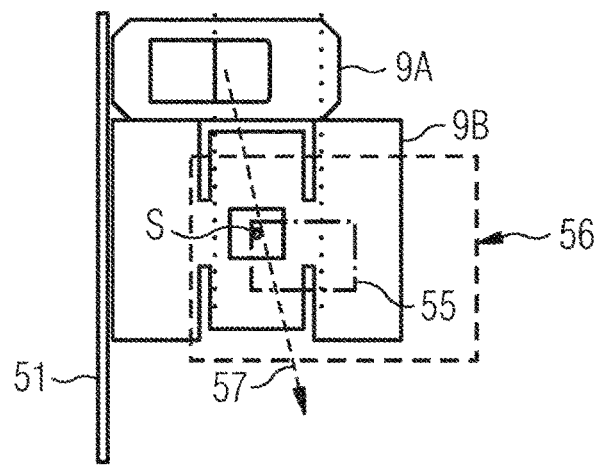
Figure 4C:
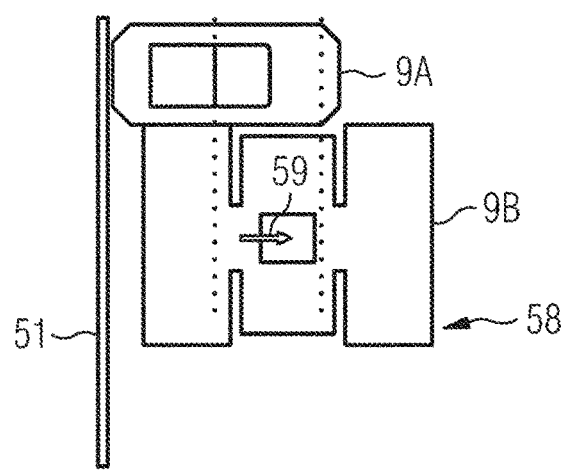

Depending on an evaluation result of the initial position of a newly inserted sub-space, a local search space is set up (step 45C, 47C, . . . ), which includes at least one alternative position for the newly inserted sub-space (see also search space 55 and exemplary dashed alternative position 56 in FIG. 4B). The alternative positions in the search space are again evaluated with the packing density evaluation and the at least one evaluation incorporating the position data (step 45B', 47B', . . . ).

One-dimensional search spaces can extend in the planning space and include, for example, alternative positions arranged along a straight or curved line. Two-dimensional search spaces can also extend in the planning space and, for example, start from the center of gravity of the initial position. For example, a two-dimensional search space contains all points on which the reference point of a sub-space, e.g., the center of gravity, can be placed. Furthermore, another dimension for a search space may include rotation states of a sub-space. These may also be associated with a reference point. Another one-dimensional search space may further include positions of the pressure point on a contour of a sub-space. These can also be assigned to a center of gravity position, for example, as a reference point. Multi-dimensional search spaces can be formed by combining the above search spaces.

Now the evaluation results of the initial position and the at least one alternative position are compared (step 45D, 47D, . . . ). Based on the result and specifically for the insertion sequence, one of the evaluated positions is defined as the cutting position (see also cutting position 58 in FIG. 4C) for the newly inserted sub-space in the nesting plan (step 45E, 47E, . . . ). For a sub-space, the arrangement is completed with the definition of the cutting position and the next sub-space according to the insertion sequence is determined and inserted.

Once all sub-spaces have been added in this way according to the insertion sequence, evaluated and optimized in position with respect to the position data, a nesting plan 49A has been generated that includes the sub-spaces arranged at the cutting positions. For the nesting plan 49A, a total evaluation can be formed from the evaluations of the individual sub-spaces. The nesting plan 49A can be output (for example, together with its total evaluation) or stored in a memory of the controller or the planning unit (step 49).

With respect to the alternative positions in the search space, alternative positions can generally be created by applying a translation and/or rotation operation to the initial position or another alternative position. The search space can, inter alia, also be constructed in this way, whereby further boundary conditions need to be fulfilled, such as no overlapping, not too wide a displacement, etc. The extent of translation and rotation depends in particular on the evaluation procedure. For example, if the aim is to achieve the highest possible packing density, the translations will be spatially limited. Such a limitation of the search space can be achieved, for example, by including weights $W_{PD}$ explained below when setting-up the search space. In general, the local search space will have as large a number of alternative positions as is reasonable in terms of computational time. As different geometric conditions on the supported spaces as possible should be evaluated.

The alternative positions can be created, for example, by shifting step by step by predetermined increments in one or two directions, checking in each case whether the sub-spaces are overlap-free and still lie in the planning space. The displacement can be accompanied by a rotation of the sub-space or only a rotation can be performed if, for example, the boundary condition of the overlap-free arrangement cannot be fulfilled with a pure displacement. Furthermore, the displacement may preferably be performed against a last direction underlying the arrangement rules. Alternatively, the displacement can be done along a direction in which the minimum distance to an adjacent sub-space is given (or along a direction in which the minimum distance relates to an edge contour of the planning space, which in this case is comparable to a contour of a sub-space, for example, eventually with a different minimum distance). The displacement may further be along a connecting line of centers of gravity of neighboring sub-spaces.

For example, the newly inserted sub-space arranged in the alternative position may have a greater distance from a previously inserted sub-space (or an edge contour of the planning space) in at least one direction than the newly inserted sub-space has in the initial position. In general, the newly inserted sub-space in the alternative position may have been displaced from its initial position in at least one direction, provided that the alternative position is also free of overlap with respect to previously inserted sub-spaces.

Furthermore, the arrangement rule may have an approach direction associated with it, and in the alternate position, the newly inserted sub-space may have been displaced in a direction opposite to this approach direction from the initial position.

FIG. 4A illustrates the arrangement of two sub-spaces: a previously inserted sub-space 9A and a newly inserted sub-space 9B. According to an exemplary bottom-left arrangement rule, the sub-space 9B was first moved in the direction of an edge contour 51 of the planning space (arrow 53A) until the sub-space 9B is still inside the planning space. Then, the sub-space 9B was moved along the boundary contour 51 in the direction of a previously positioned sub-space (arrow 53B). Once the minimum distance to the previously positioned sub-space is reached, an initial position 54 is reached.

It is assumed that the evaluation of the initial position 54 resulted in a tipping probability for the sub-space 9B. Accordingly, a local search space 55 needs to be set up, which includes alternative positions for comparative evaluations of the tilt probability. The search space 55 is schematically indicated as a dash-dotted rectangle in FIG. 4B. In FIG. 4B, the search space 55 has been shown with respect to the center of gravity S of the sub-space 9B as reference point; i.e., one corner of the rectangle is formed by the location of the center of gravity of the sub-space in the initial position 54. Shown as a dashed rectangle is an exemplary alternative position 56, the center of gravity of which is also located in the search space 55. The search space 55 extends contrary to one of the directions from the arrangement rule (here contrary to the arrow 53A) over a length that corresponds, for example, approximately to the distance between two series of supported spaces. The extent of the search space 55 is a little smaller contrary to the other of the directions from the arrangement rule (here contrary to the arrow 53B).

In the search area 55, there are several alternative positions that are evaluated. The most favorable alternative position in terms of tilt stability and packing density is shown as cutting position 58 in FIG. 4C. The cutting position 58 corresponds to a parallel translation of the initial position 54 of the sub-space 9B along an arrow 59 maintaining the minimum distance to the sub-space 9A, but increasing the distance to the edge contour 51. In order to generate as little lost material as possible, the translation was only carried out until a predetermined limit is reached with regard to the tipping stability.

FIG. 4B shows another exemplary translation direction (dashed arrow 57) between the initial position and the alternative position. A translation along the arrow 57 increases the distance between the centers of gravity of the sub-spaces 9A, 9B, whereby the minimum distance for the two sub-spaces is no longer given.

FIG. 4D illustrates setting up a local search space when using a no-fit-polygon approach. One can see a cluster 61 of several previously arranged sub-spaces. Using the no-fit-polygon approach, an initial position 63 was found for a newly added sub-space 9D. The sub-space 9D partially projects into a recess in the cluster 61 and has a minimum distance MA to two neighboring previously positioned sub-spaces. While maintaining boundary conditions, a search space 65 was set up that, at least if the orientation of the sub-space 9D remains unchanged, does not lead to an overlap with the sub-spaces of the cluster 61. In this sense, the search space 65 extends "away" from the cluster 61. Exemplarily, the search space 65 again refers to the center of gravity S as reference point of the sub-space 9D. For all or some of the alternative positions in the search space 65, packing density evaluations and evaluations incorporating the position data may again be performed to determine a cutting position.

FIG. 4E illustrates setting up a (one-dimensional) local search space for an evaluation that incorporates the position data of the supported spaces for a mechanical tilt analysis. The search space refers to a variation of the position of the pressure point on a contour 67 of a sub-space 9A.

As an example, FIG. 4E shows in a diagram a curve of a tilting probability K over positions P of the pressure point on the contour 67 of the sub-space 9A, and specifically assuming a fixed position of the sub-space 9A with respect to the supported spaces. The diagram shows an extended stable area (low tipping probability), e.g., at position P2, and an unstable area (increased tipping probability) around position P3. Position 1 can neither be linked to the property "stable" nor the property "unstable".

The positions P1, P2, P3 are given as examples for a schematic representation of the sub-space 9A on the contour 67. The search space is one-dimensional and has at most the size of the circumference of the sub-space 9A.

As an example, the additive combination of three evaluation methods is explained below. The three evaluation methods can be weighted differently depending on the requirements of the cutting process. As an example, an additive weighting of the following three evaluation approaches can be carried out:

An evaluation of the amount of lost material: Lost material is the material of the material sheet that is not assigned to a sub-space of the planning space during implementation.

An evaluation of the risk of tilting of cut pieces based on a leverage analysis: one considers the mechanical effect of the gas pressure acting at the gas pressure point. Under certain geometric conditions, after transferring the nesting plan to a material sheet, the effect of the gas pressure can cause a (tilting) movement of the piece. The gas pressure point corresponds to the point on the cutting line that is cut through last, because this is where the gas pressure first acts on the free-cut workpiece. The gas pressure point usually depends on the approach to the cutting contour. For the evaluation, the position of the gas pressure point with respect to the support points can be evaluated as the position of a pressure point in the planning space with respect to the supported spaces, in order to determine the tilting behavior of a sub-space with respect to the supported spaces. This corresponds in the implementation the stability of the support of a workpiece on the supporting areas. For nesting, one can introduce, for example, three evaluation classes for sub-spaces: stable, no statement about the tilting probability possible, tilting risk (unstable). In summary, the torque is the parameter to be considered in the evaluation of the risk of tipping, where the torque results from the acceleration due to the gas pressure force, the distance of the point of application of the gas pressure force from a possible pivot point, and the weight distribution.

An evaluation of the damage rate and/or workpiece quality: When performing a cutting process in the region of a support bar, especially on a supporting area, the interaction of the laser beam is not limited to the material sheet, so that deviations from the desired cutting process and laser processing of the structures supporting the material sheet may occur.

With regard to an exemplary additive evaluation function "min . . . ", FIG. 5 shows a mathematical model, which can be used as a basis for the process-oriented nesting proposed herein. According to the model, evaluations (objective function variables $z_{PG}$, $z_T$, and $z_{SD}$) are performed for packing density, tilt, and support damage/part quality, respectively; weights $W_{PG}$, $W_T$, and $W_{SD}$ are provided. The model is subject to several constraints, which are summarized mathematically in FIG. 5: Constraint (1) determines the length of the planning space (for a given width); constraint (2) determines the variable "damage"; and constraint (3) determines the variable "stability" for all sub-spaces. Constraint (4) ensures that all sub-spaces are placed; the constraint (5) prevents overlapping of parts; and constraints (6) and (7) set the values for the variables.

In the model, the planning space is gridded with a certain number of points. The points are arranged in columns c and rows r so that each point can be identified by its row and column number (c, r). In the model, all points are first set to "0". The types of sub-spaces t are matrices that have the size of the bounding box of a workpiece type to be cut, and use binary values to represent the shape of the workpiece type. Different but predefined rotations of a sub-space can be implemented in the model by having the set of all types of sub-spaces t form a matrix where each row is a type of sub-space and each column includes a different rotation state. Therefore, the number of columns i is equal to the number of allowed rotation states. The sub-spaces, in this case, can be written as $ti \in Ti$ to indicate the rotation states. The number of sub-spaces to be placed on the sheet is given by qt for each type of sub-space.

To check whether a piece is completely placed in the planning space, an inner fit polygon (IFP) can be used, for example. This IFP is the set of all those points on which the reference point (e.g., center of gravity) of a sub-space can be placed so that the sub-space is still completely placed in the planning space. Based on the position of the reference point j, the sub-space ti to be inserted is added to all (c, r). The placement of all sub-spaces may not result in a (c, r) greater than 1, as this would indicate an overlap.

The supported spaces are modeled as a grid $\Psi$ as large as the planning space with (c, r)={0, 1, 2}. The values $\psi(c, r)$ indicate whether there is support at a point in the planning space (value 2), i.e., the point is in a supported space (when converted in the cutting process, the sheet is supported); or there is no support (value 0) (when converted in the cutting process, there is free space under the sheet); or there is no support, but still there is a structure near or far away (value 1) (when converted in the cutting process, the point is above a support bar, but not in the supporting area; i.e., the point is not a supported point for the support of the sheet).

A sub-space is defined with $\theta(c, r)=1$ for each point on the contour of the sub-space and zero otherwise. Depending on the center of gravity S of a sub-space and the pressure point D, it can be calculated whether the sub-space (or the cut workpiece) will tilt. This is expressed with the variable $\zeta$, where "0" encodes a stable sub-space, "1" encodes a sub-space with an indeterminate tilting tendency, and "2" encodes a sub-space with a tilting tendency.

The process-oriented minimization problem considers the packing density $z_{PD}$, the stability of the sub-space $z_T$, and the extent of damage of the $z_{SD}$. The different variables are weighted with the weights $W_{PD}$, $W_T$, $W_{SD}$ and combined additively. A smaller weight value represents a more favorable situation of a sub-space.

With regard to the size of a search space, it should be noted that the larger $W_T$ and $W_{SD}$ are in relation to $W_{PD}$, the larger the local search space will be, because a large local search space is more likely to result in solutions with low packing density. However, this is not necessarily the case, because pieces can be placed later in the free space.

With reference to the schematic flowchart of a method 71 for nesting arbitrary sub-spaces in the two-dimensional planning space, which is shown in FIG. 6, the method can be decomposed into an insertion sequence of sub-spaces and a fixed arrangement rule, in particular for an implementation in an evolutionary algorithm. E.g., with an evolutionary algorithm, the insertion sequence of sub-spaces to be inserted can be changed with the optimization objective to achieve an insertion sequence with the best possible total evaluation value. The implementation of a nesting algorithm as an evolutionary algorithm is known for example from "Genetic Algorithms and Grouping Problems", E. Falkenauer, New York: Wiley, 1998.

The evaluation proposed herein-present in a fitness function (Min-function in FIG. 5) of the evolutionary algorithm-implements the approach that, in order to achieve good improvements, an arrangement rule can be used that uses a search space and does not necessarily insert the pieces to form a densest packing, but also takes into account the position of the sub-space (workpiece) in the planning space (metal sheet, material sheet) and the position of the sub-space (workpiece) relative to the supported spaces (supporting points of the support bars).

This procedure can also be understood as a kind of total cost consideration. Not only the required material is taken into account, but also the expected collision frequency, the expected bar damage, etc. with the corresponding cost rates.

With regard to the local search space and the local search as explained in connection with FIGS. 3 and 4A to 4D, the sub-space to be inserted can be shifted in a non-material-optimized direction until the cost of the lost material, which is generated, exceeds the maximum possible benefit in terms of possible cost disadvantages due to, for example, damage to supporting areas. In other words, the local search space is used to test how large possible improvements are in regions without considering material utilization. From the positions tested, the best evaluated position is then selected as the cutting position.

Referring again to the flowchart in FIG. 6, the generation of a nesting plan in method 71 is based on a predetermined insertion sequence. This can be used as a gene of an evolutionary algorithm.

In a first step 73 of the nesting procedure 71, the genes are initialized. The initial insertion sequences (genes) can, for example, be generated stochastically or be based on empirical values.

Each of the genes is used to generate a nesting plan (step 39), as explained, for example, in connection with FIG. 3. A fitness function is thereby built as described above on a packing density evaluation in combination with at least one evaluation incorporating the position data of the supported spaces.

Next, a comparison of total evaluations is performed for the entire gene generation (step 75). Based on well-assessed genes, further generations are generated by selection, mutation, and crossover (step 77), in order to generate—as new insertion sequences—further nesting plans in newly carried-out step 39, to generate total evaluations in newly carried-out step 75, and to compare these total evaluations in order to repeatedly open up new generations of genes based thereon. In this process, selection generally ensures that well-evaluated genes have more influence on the next generation. The evaluation and development of further generations of insertion sequences is continued, for example, up to a desired total evaluation value or up to a maximum number of generations.

The nesting plan with the then available best total evaluation is finally output as cutting process-oriented nesting plan 79A (step 79).

Figure 7A:
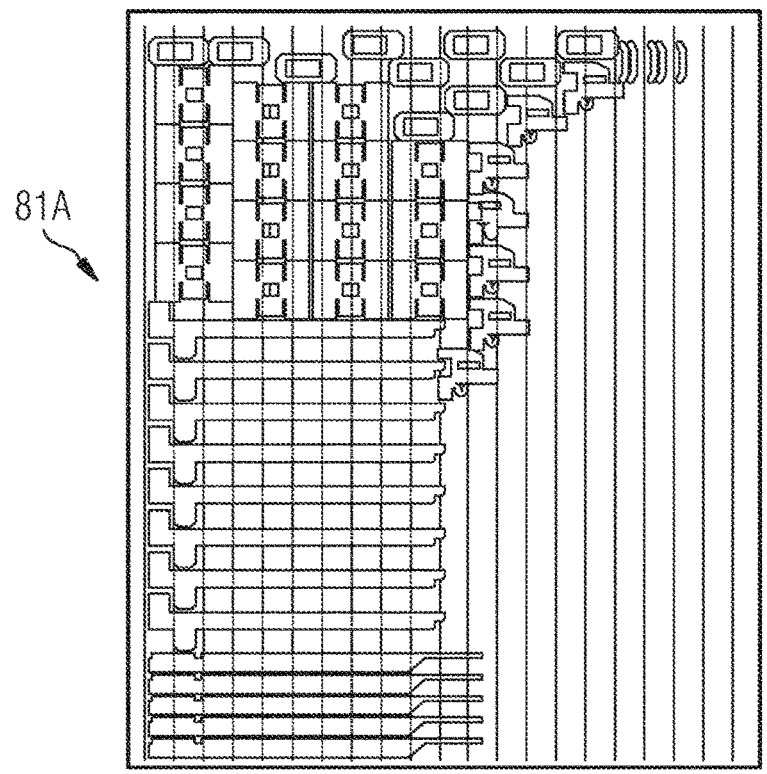
FIG. 7A-7C are schematic representations of nesting plans optimized with local searches.
Figure 7B:
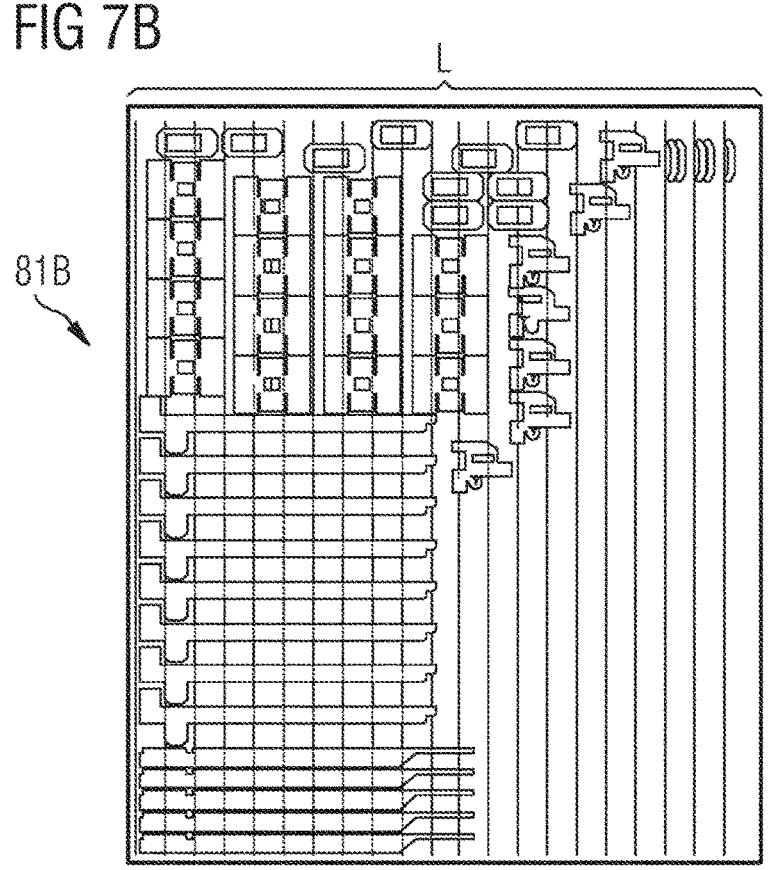
Figure 7C:
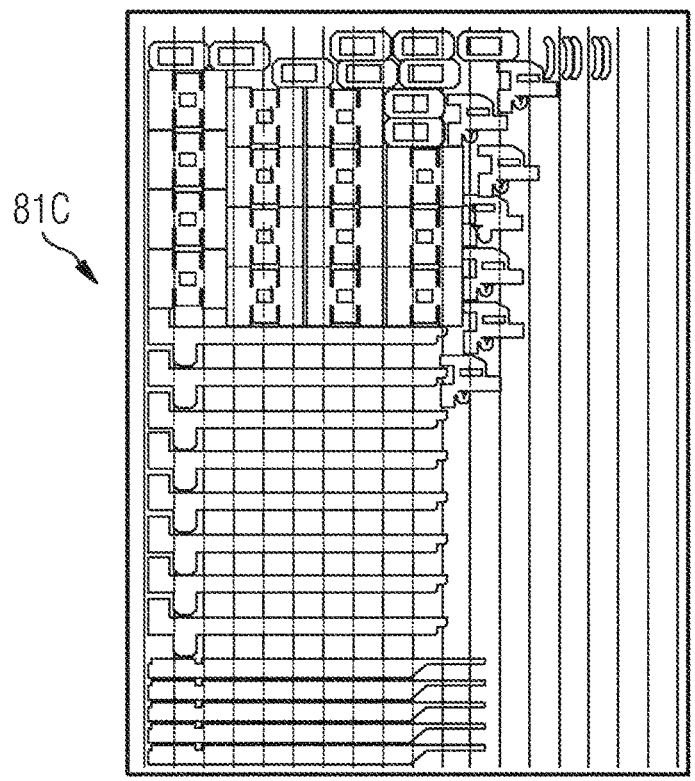

FIGS. 7A-7C show three cutting process-oriented nesting plans for a 2 mm thick structural steel sheet with a density of 7856 kg/m3. The nesting plans have been generated for different weights of the objective function variables $z_{PG}$, $z_T$ and $z_{SD}$ and thus target directions of the optimization. In each case, the improvement becomes obvious in a comparison with a total evaluation of the nesting plan shown in FIG. 2. The arrangement shown in FIG. 2 has a total evaluation with 20 stable sub-spaces, 3 unsupported sub-spaces, 21 sub-spaces at risk of tipping, and 6 sub-spaces that cannot be uniquely assigned.

Assuming a stationary pressure point, stabilization against tilting can only be achieved by shifting; i.e., shifting until the center of gravity of the sub-space is sufficiently surrounded by supported spaces to withstand the gas pressure.

For nesting methods with a fixed (non-optimizable) approach point, cutting process-oriented nesting plans for a "light" and a "strong" process-oriented nesting are shown in FIG. 7A and FIG. 7B.

A light process-oriented nesting is subject to exemplary weights such as weight 1 for area efficiency ("$z_{PG}$"), weight 2 for tilt susceptibility ("$z_T$"), and again weight 1 for damage ("$z_{SD}$"). As a result, the arrangement shown in FIG. 7A includes 25 stable sub-spaces, 5 unsupported sub-spaces, 17 sub-spaces at risk of tipping, and 3 sub-spaces that cannot be uniquely assigned in the cutting process-oriented nesting plan 81A.

A strong process-oriented nesting is subject to exemplary weights such as weight 1 for area efficiency ("$z_{PG}$"), weight 10 for tilt susceptibility ("$z_T$"), and again weight 1 for damage ("$z_{SD}$"). In this regard, the arrangement shown in FIG. 7B includes 45 stable sub-spaces, 5 non-supported sub-spaces, and no sub-spaces that are at risk of tipping or cannot be uniquely assigned in the cutting process-oriented nesting plan 81B.

For a nesting method in which a variable and thus optimizable pressure point for the sub-spaces is also implemented, a cutting process-oriented nesting plan 81C is shown in FIG. 7C.

If the pressure point for a sub-space can be variably adjusted, the position of the pressure point on the contour of the sub-space can also be favorably selected if the center of gravity of the sub-space is not stably supported. In other words, if a sub-space is not statically stable, a "stable" pressure position can be found for most sub-spaces and positions of supported spaces. For this purpose, first a search space is set up for each possible alternative position analogous to the previous approach. Then, the alternative position is selected, which ensures the best static stability of the workpiece and has the smallest displacement compared to the initial position. Then, the stability of the sub-space is evaluated for each or a selection of points on the contour as a pressure point. The position of the pressure point with the lowest tilting tendency (most stable torque situation) is selected as the pressure point if the sub-space is stable for this point and this alternative position. If the latter is not the case, the sub-space in the initial position can be examined with regard to the best pressure point. The position of the pressure point with the lowest tilt tendency in the initial position is then selected as the pressure point and is included in the total evaluation.

When nesting with a variable and thus optimizable pressure point, the arrangement rule is thus adapted and it is additionally examined how big the possible improvement is with regard to tilting compared to material utilization if the center of gravity is not stably supported. For this purpose, the stability is checked for each or a selection of points on the outer contour as pressure points. The search space thus becomes three-dimensional, because each alternative position is still assigned a plurality of pressure point positions.

An exemplary process-oriented nesting with a variable pressure point thereby achieves—in the nesting plan 81C shown in FIG. 7C-43 stable sub-spaces and 5 unsupported sub-spaces, 2 sub-spaces at risk of tipping and no sub-spaces that cannot be uniquely assigned.

With regard to the space occupied in the planning space, the bottom-left strategy for the above case takes up a strip length L (indicated exemplarily in FIG. 7B) of 862 mm, process-oriented nesting in nesting plan 81C with a variable approach point takes up 946 mm, and light nesting or strong nesting (nesting plans 81A and 81B) take up 1107 mm and 1227 mm.

FIGS. 8 to 12 refer to an exemplary evaluation approach for the evaluation of a nesting plan with regard to the influence of supported spaces on the cutting process.

Figure 8:
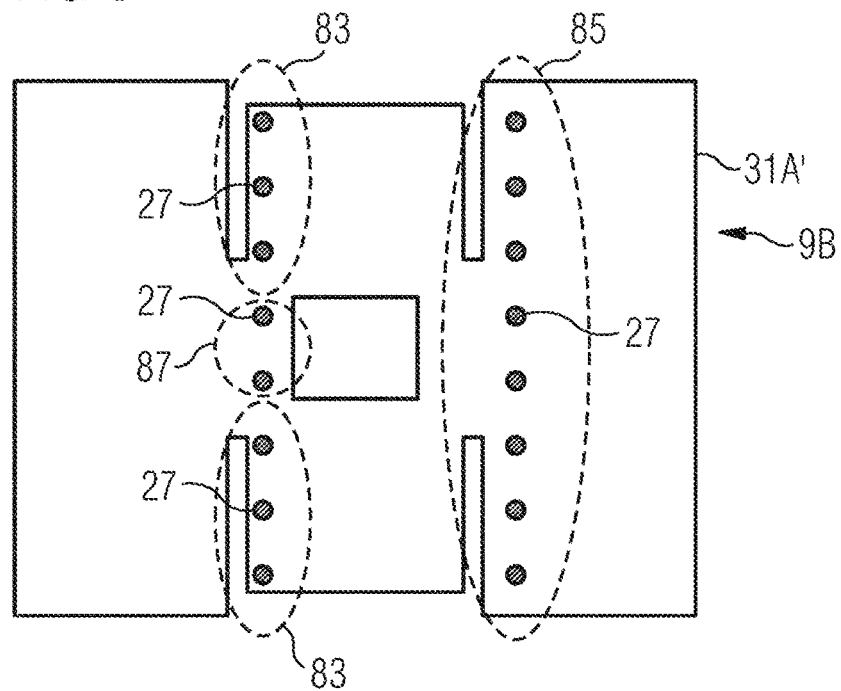
FIG. 8 is a schematic representation illustrating the consideration of supported spaces.

FIG. 8 shows the sub-space 9B from FIG. 2 enlarged. One can see the outer contour 31A' that bounds the sub-space 9B, as well as exemplary point-shaped supported spaces 27. Supported spaces 27 in regions 83 essentially coincide with the outer contour 31A' in the area of the cuts. Supported spaces 27 in a region 85 lie near the outer contour 31A' in the area of the cuts. Supported spaces 27 in a region 87 lie far from the outer contour 31A'. The evaluation process explained below differentiates, inter alia, the effects of the supported spaces 27 on the cutting process for such categories of relative positions between the supported space and the contour.

Figure 9:
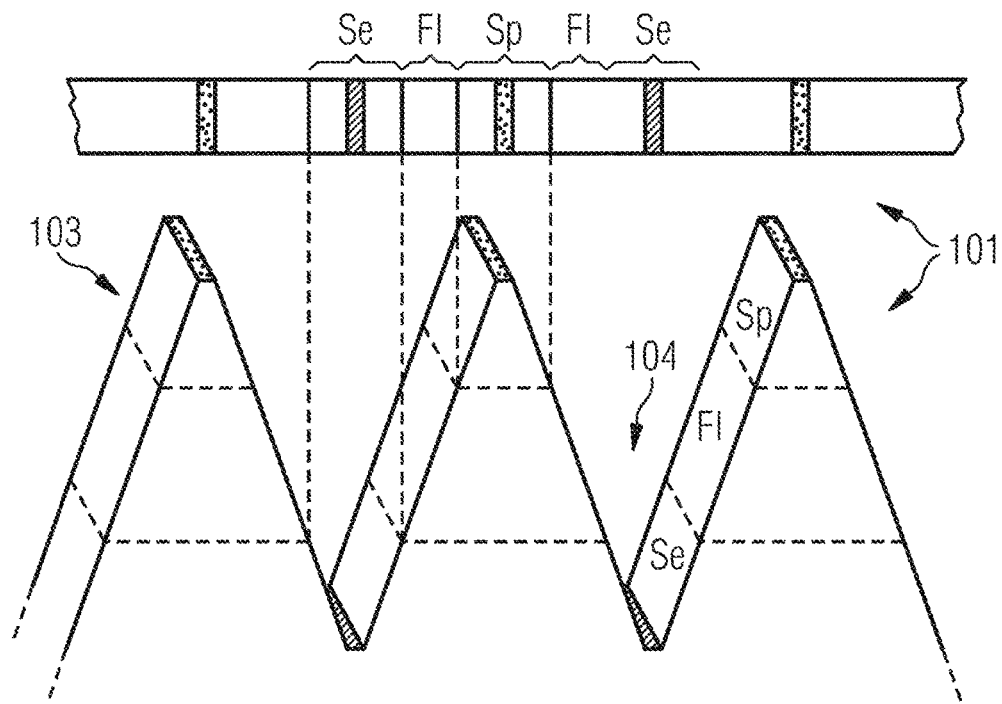
FIG. 9 is a schematic representation of a support bar.

The relative positions are exemplarily illustrated in FIG. 9 with a top view of a support bar 101 and a schematic perspective view of the support bar 101, for example, using a bar structure in which supporting tips 103 are separated from each other by "V"-shaped depressions 104. The material sheet lies stationary on a plurality of supporting tips 103 during the cutting process.

Figure 10:
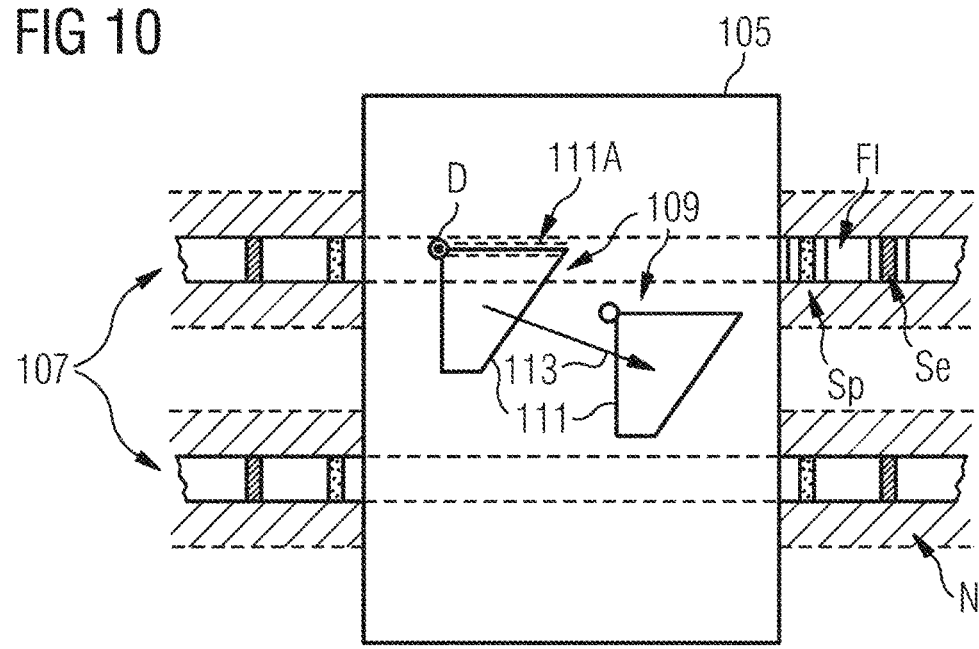
FIG. 10 is a schematic representation of a displacement of a sub-space in the planning space to avoid overlapping with support spaces.

For such a support bar, FIG. 10 shows a section 105 of a planning space through which two rows 107 of (supported) spaces run, which are related to the supported spaces that could be formed, for example, by the bar structure of FIG. 9.

Furthermore, FIG. 10 shows a sub-space 109 in which the pressure point D and a section 111A of an outer contour 111 bounding the sub-space 109 extend above one of the rows 107. Additionally, FIG. 10 shows the sub-space 109 after a displacement along an arrow 113, whereby the outer contour 111 is now located between the rows 107.

Several possible categories of relative positions between positions/sections of the contour and the rows of supported spaces can be defined as spaces in the planning space. Examples of categories from the point of view of the implementation of the nesting plan on the material sheets are:

supported (tip space SP),
next to a support tip 103 and at a small distance above the surface of the support, e.g., above the support bar 101 (flank space Fl),
between the supporting tips 103 and with a large distance above the surface of the support (sink space Se), and
near/directly next to a support bar 101 (near space N).

The spaces Sp, Fl, Se from the planning space are also indicated in the physical representation of the support bar shown in FIG. 9 for illustration. Similarly, the positions of the tips and valleys are also indicated schematically in the planning space.

Figure 11:
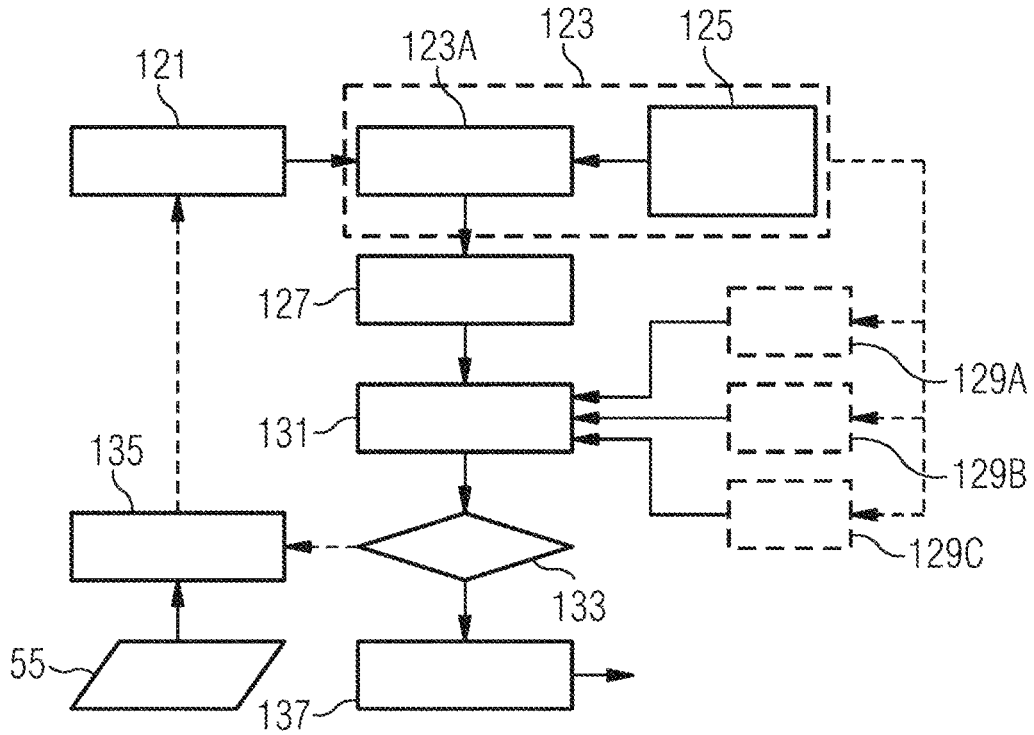
FIG. 11 is a flow diagram of a method for evaluating a position of a sub-space using position data of support spaces.

FIG. 11 shows an exemplary sequence of an evaluation of a position of a sub-space, the evaluation incorporating position data; i.e., relative positions between spaces of the support and a sub-space are taken into account. The evaluation procedure of the nesting plan defined in the planning space concerns—in the implementation—the cutting process of an arrangement of workpieces on a material sheet, which are to be cut out with a flatbed machine tool according to workpiece-specific cutting contours. The flatbed machine tool has, for example, a pallet with a plurality of support bars for supporting the material sheet, each support bar having a plurality of bar tips on which the material sheet lies stationary during the cutting process.

It is thus assumed that position data indicating the positions of the support spaces, in particular the supported spaces, in the planning space are known. In the implementation of the nesting plan, this means that either the material sheet is to be aligned accordingly on the bar tips of the pallet or that position data of the material sheet with respect to the pallet are determined before the method is carried out. In general, positions of the support bars, the bar tips with respect to the pallet and/or with respect to the material sheet are thus recorded and/or provided. Possibly, additional arrangement data regarding the arrangement of the planning sheet on the material sheet are measured or predetermined.

FIG. 11 can be a partial step, which is carried out in the method for generating the nesting plan of the sub-spaces (contours of the sub-spaces correspond to the later cutting lines) for a cutting process. In the partial step, a damage rate for a contour is to be determined. For this purpose, supported space-near (i.e., bar-near) sections of the contour are examined and subdivided, for example, into the above space categories Sp, Fl, Se, N. This includes, inter alia, subdividing the spaces that would lie above or next to a support bar when implementing the nesting plan.

To calculate the damage rate of a contour, the spaces are provided with weight factors that define a damage probability of the support bars depending on the areas and cutting types. Weights can also be applied to the cutting process if it uses several cutting types; cutting types are differentiated, for example, according to the laser power applied. Cutting types can concern the incision, the approaching of the contour, and the cutting along the contour.

Finally, an evaluation quantity of the nesting plan based on the calculated damage rate of the contour is output and used in the nesting procedure to evaluate a position of a sub-space.

This basic concept is reflected in the flowchart in FIG. 11. The evaluation starts with the placement of a sub-space in a position to be evaluated in the planning space (step 121). Depending on the state in the nesting method, this can be, for example, the starting position of the first sub-space, an initial position or an alternative position.

In step 123, the individual positions of the contour of the sub-space are examined. In particular, the intersection of the contour of the sub-space with the support spaces (Sp, Fl, Se, N) is formed (step 123A) and corresponding positions of the contour are stored. If additional cutting types are provided with the contour (step 125), the individual positions can further be associated with the addressed cutting types.

Figure 12:
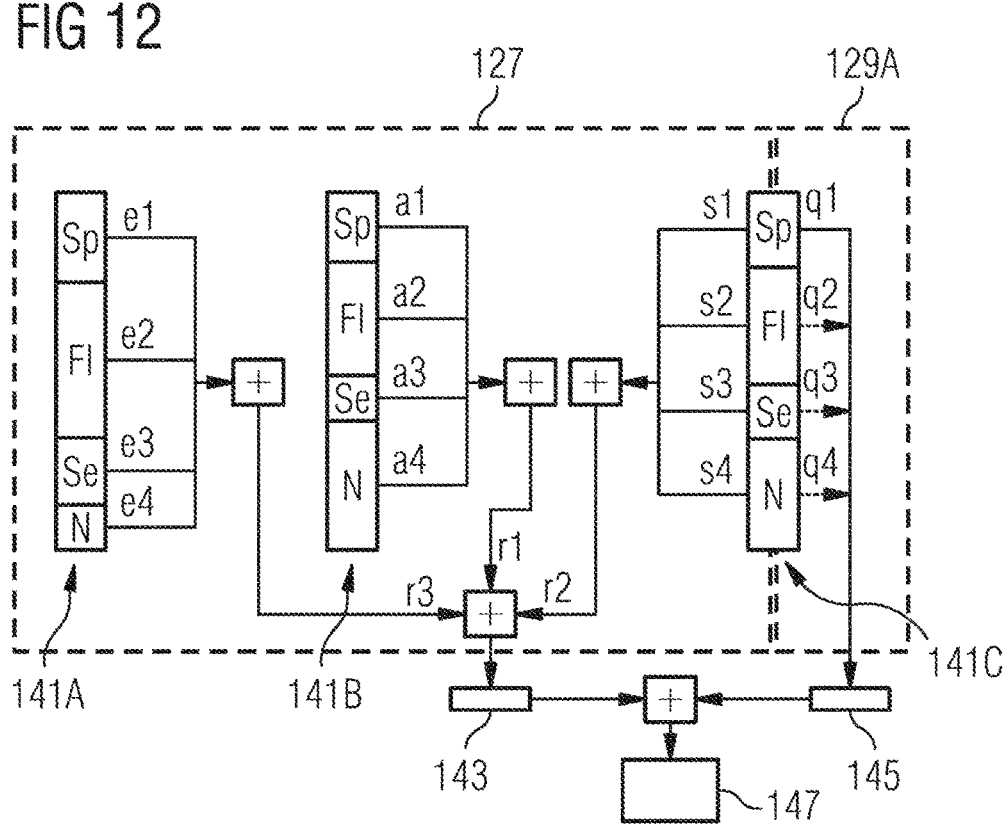
FIG. 12 is a sketch for illustrating the weighted calculation of a damage evaluation.

Based on this, bar damage values, for example as explained below in connection with FIG. 12, are calculated (step 127).

If further position-dependent evaluations are to be taken into account, for example a quality of a workpiece (step 129A), a tilt evaluation (129B), or a slug analysis (129C), these can also be included in an evaluation value (step 131) that is stored for the position of the sub-space to be evaluated.

A test is then performed to determine whether a further position is to be evaluated (step 133). If this is the case—for example, if not all alternative positions have been tested in a search space 55—an alternative position can be selected (step 135) and fed into the evaluation method as the position to be evaluated in step 121.

Once all positions have been tested, the one with the best evaluation value is selected and output as a cutting position, for example (step 137). The next sub-space is now inserted in accordance with the arrangement rule and its initial position becomes the position to be evaluated. This is continued until all sub-spaces in the insertion sequence have been inserted. All evaluation values together then form the total evaluation value of the resulting nesting plan.

FIG. 12 gives an example of calculations on which step 127 (damage risk calculation) and step 129A (workpiece quality calculation) are based. Shown are three bars 141A, 141B, 141C, in which, according to the intersection formation in step 123A of FIG. 11, positions of the contour are summarized, which are assigned to the spaces Sp, Fl, Se, N. Thereby, cutting types of incision (bar 141A), approach with reduced power (bar 141B), and cutting (bar 141C) were considered. Each type of support space Sp, Fl, Se, N is assigned cutting type-specific weight factors e1-e4, a1-a4, s1-s4. With these weights, the points on the contour are included in the support space-specific evaluation. Weight factors r1-r3 can also be assigned to the cutting types, which flow into the cutting type-specific combination. In this way, a bar damage evaluation value 143 can be determined for the damage risk.

Furthermore, for the positions on the contour that are assigned only to cutting (bar 141C), for example, a quality of the workpieces resulting from the positions of the sub-space can be evaluated. For this purpose, supported space-specific weight factors q1-q4 are used so that a quality evaluation value 145 of a workpiece can be determined for the quality of the workpiece. This can be combined with the bar damage evaluation value 143 to form a total evaluation value 147 of the contour and thus of the sub-space.

It can be seen that sections of the contour or positions along the contour are assigned to the supported spaces 27 (tip spaces Sp) with the aid of the position data for evaluating a sub-space positioned in an alternative position 46. An evaluation value of the position of the sub-space to be evaluated is then determined depending on the extent of the assigned sections of the contour or positions along the contour for the supported space.

In addition to the supported spaces 27, further support spaces Fl, N, Se can be identified in the planning space. Sections of the contour or positions along the contour can also be assigned to these using the position data to evaluate a sub-space positioned in an alternative position 46.

Evaluation values for the support spaces Fl, N, Se are determined depending on the extent of the sections of the contour assigned to the further support spaces or the positions along the contour. Accordingly, the evaluation values of the supported spaces and the further support spaces can be combined with weights to obtain an evaluation value for a position of the sub-space to be evaluated.

In general, the weights may depend on an energy input value, and a weight may be larger (e.g., a maximum value) for a cutting operation in the bar tip space. Lower weights may be used for a cutting operation in the bar flank space, for a cutting operation in the bar sink space, and for a cutting operation in the space near/directly adjacent to the row of said spaces.

Summarized in words of a cost assessment, the nesting approach disclosed herein can evaluate the goodness of the solution for each solution. Thereby the quality function includes besides the raw material consumption also:
the costs due to collisions of the cutting head with tilted parts,
the costs due to damage of support bars,
quality costs due to faulty production, reworking, and maintenance, and/or
the costs due to longer cutting times and higher depreciation.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A flatbed laser cutting machine system for cutting workpieces from a material sheet, the flatbed machine tool system comprising:
   a flatbed machine tool comprising:
      a laser processing head comprising a nozzle from which a laser beam is configured to emerge to cut the material sheet;
      a pallet comprising support bars, the support bars forming a support area for the material sheet; and
      a first controller configured to operate the flatbed laser cutting machine based on a nesting plan for controlling the cutting process of the flatbed laser cutting machine; and
   a second controller configured to execute a method for generating the nesting plan for controlling the cutting process of the flatbed laser cutting machine
   wherein the nesting plan comprises an overlap-free arrangement of sub-spaces, which correspond to the workpieces, in a two-dimensional planning space, and a spatial arrangement of predetermined supported spaces, wherein the predetermined supported spaces corresponding to support surface areas of the material sheet, which are supported during the cutting process by the support bars,
   wherein the method for generating the nesting plan comprises:
      providing cutting process data comprising:

geometry data of the two-dimensional planning space in which the sub-spaces can be arranged, position data indicating positions of the predetermined supported spaces in the two-dimensional planning space, sub-space data corresponding to a plurality of the sub-spaces each corresponding to a workpiece type, and number data indicating quantities of the sub-spaces to be nested in the two-dimensional planning space;

providing nesting input parameters comprising:

a workpiece minimum distance that at least is present between two adjacent ones of the sub-spaces arranged in the two-dimensional planning space, an insertion sequence according to which the sub-spaces are inserted during a sequential generation of the nesting plan, and an arrangement rule according to which the sub-spaces are arranged spatially within the two-dimensional planning space one after the other:

arranging a first sub-space, of the sub-spaces, according to the insertion sequence and the arrangement rule in the two-dimensional planning space; and sequentially inserting of further sub-spaces, of the sub-spaces, in accordance with the insertion sequence and the arrangement rule in the two-dimensional planning space, the arrangement rule assigning to a newly inserted sub-space, of the sub-spaces, in the two-dimensional planning space respectively an initial position in which at least one point of the newly inserted sub-space is arranged at the workpiece minimum distance from another sub-space, of the sub-spaces, previously inserted;

wherein, after each new insertion of a sub-space of the sub-spaces, the method for generating the nesting plan comprises further comprises performing a packing density evaluation and at least one evaluation incorporating the position data of the respective initial position of the newly inserted sub-space, and wherein the method for generating the nesting plan further comprises:

setting up, based upon on an evaluation result of the packing density evaluation of the initial position of the newly inserted sub-space, a local search space that comprises at least one alternative position for the newly inserted sub-space, evaluating the at least one alternative position with the packing density evaluation and the at least one evaluation incorporating the position data; and comparing the evaluation results of the initial position and the at least one alternative position in order to determine, for the insertion sequence, one of the evaluated positions as a cutting position for the newly inserted sub-space, in the nesting plan.

2. The system according to claim 1, wherein the method for generating the nesting plan further comprises outputting the nesting plan that includes the sub-spaces arranged at the cutting positions.

3. The system according to claim 1, wherein the method for generating the nesting plan further comprises at least one of:

forming the local search space one-dimensionally or two-dimensionally in the two-dimensional planning space;

setting-up the local search space such that it includes alternative positions, for the occupation of which a sub-space, of the sub-spaces, to be inserted is to be displaced from the initial position in a non-material-optimized direction in the two-dimensional planning space; or for setting up the search space, applying a translation operation or rotation operation in the two-dimensional planning space to the initial position or to another alternative position, while maintaining the boundary condition of an overlap-free arrangement, to generate alternative positions.

4. The system according to claim 3, wherein forming the local search space one-dimensionally or two-dimensionally in the two-dimensional planning space comprises extending in the two-dimensional planning space away from previously inserted sub-spaces of the sub-spaces, and wherein the translation rotation operation is in a non-material-optimized direction.

5. The system according to claim 1, wherein the method for generating the nesting plan further comprises:

making a plurality of evaluations, which incorporate the position data, for a to be evaluated position of the sub-space, and combining the evaluation values of the evaluations and of the packing density evaluation with weights for determining an evaluation value of the to be evaluated position of the sub-space.

6. The system according to claim 5, wherein the method for generating the nesting plan further comprises at least one of:

choosing the weights to achieve a specific characteristic of the nesting plan; or adjusting a size of the local search space variably by the weights.

7. The system according to claim 1, wherein the method for generating the nesting plan further comprises:

assigning, using the position data, sections of a contour or positions along the contour to the predetermined supported spaces for evaluating a sub-space, of the sub-spaces, positioned in an alternative position, and determining an evaluation value of the position of the sub-space to be evaluated for the supported space in dependence of the extent of the assigned sections of the contour or the positions along the contour.

8. The system according to claim 7, wherein the method for generating the nesting plan further comprises:

identifying additional support spaces in the two-dimensional planning space and assigning sections of the contour or the positions along the contour to the additional support spaces for evaluating the sub-space positioned in the alternative position using the position data, determining evaluation values for the additional support spaces in dependence of the extent of the sections of the contour assigned to the further support spaces or of the positions along the contour, and combining the evaluation values of the predetermined supported spaces and the additional support spaces with weights to obtain an evaluation value for a to be evaluated position of the sub-space.

9. The system according to claim 1, wherein a corresponding sub-space, of the sub-spaces, is defined by a contour in the two-dimensional planning space, and wherein the wherein the method for generating the nesting plan further comprises setting up the search space by at least some of possible positions of a pressure point on a contour of a sub-space to be evaluated.

10. The system according to claim 1, wherein the method for generating the nesting plan further comprises:
   providing the workpiece minimum distance specifically for a material to be cut and for the cutting process, wherein the workpiece minimum distance is predetermined, or
   implementing the workpiece minimum distance with regard to the nested alternative positions and with regard to the cutting lines.

11. The system according to claim 10, wherein the workpiece minimum distance is predetermined based upon parameters of the material and the cutting process.

12. The system according to claim 1, wherein the method for generating the nesting plan further comprises:
   setting up the search space such that at least one of:
      in the alternative position, the newly inserted sub-space has a greater distance in at least one direction from the previously inserted sub-space than the newly inserted sub-space in the initial position, or
      in the alternative position, the newly inserted sub-space is arranged in a displaced manner in at least one direction from the initial position and is free of overlap with respect to the previously inserted sub-spaces.

13. The system according to claim 1,
   wherein the arrangement rule is associated with at least one approaching direction, and
   wherein wherein the method for generating the nesting plan further comprises setting up the local search space such that, in the alternative position, the newly inserted sub-space is arranged in a manner displaced from the initial position in a direction opposite to at least one of the at least one approaching direction.

14. The system according to claim 1, wherein the method for generating the nesting plan further comprises:
   adapting an initial arrangement of the first sub-space in the position data by a translation operation or rotation operation using the evaluation incorporating the position data.

15. The system according to claim 1, wherein the method for generating the nesting plan further comprises:
   acquiring the position data by a sensor system of the flatbed machine tool, an optical sensor system, or an ultrasonic sensor system.

16. The system according to claim 1, wherein the first controller is further configured to execute a method for determining a cutting process-oriented nesting plan for controlling the cutting process of the flatbed machine tool for cutting workpieces from the material sheet, wherein the cutting process-oriented nesting plan comprises the overlap-free arrangement of sub-spaces, which correspond to the workpieces, in the two-dimensional planning space and the spatial arrangement of predetermined supported spaces, the predetermined supported spaces corresponding to support surface areas of the material sheet, which are supported during the cutting process, the method for determining the cutting process-oriented nesting plan comprising:
   providing a plurality of insertion sequences of the sub-spaces, wherein the insertion sequences represent genes of a first generation of an evolutionary algorithm,
   generating a plurality of nesting plans, a corresponding one of the nesting plans being for each of the insertion sequences according to the method for generating the nesting plan, such that in the nesting plans the sub-spaces are arranged at cutting positions determined correspondingly for the respective insertion sequence,
   generating a total evaluation value for each of the nesting plans based on the packing density evaluations and the at least one evaluation of the cutting positions of the respective nesting plan incorporating the position data, wherein the total evaluation values represent the application of a fitness function to the genes of the evolutionary algorithm,
   repeatedly creating further insertion sequences by at least one of mutation, crossover, or selection of existing insertion sequences using the existing total evaluation values, generating further nesting plans according to the method for generating the nesting plan, and creating further total evaluation values for the further insertion sequences, and
   comparing the total evaluation values to select the cutting process-oriented nesting plan from the set of generated nesting plans.

17. The system of claim 1, wherein the first controller and the second controller are separate device or a single device.

* * * * *